US008223269B2

United States Patent
Ikegami

(10) Patent No.: US 8,223,269 B2
(45) Date of Patent: Jul. 17, 2012

(54) CLOSED CAPTION PRODUCTION DEVICE, METHOD AND PROGRAM FOR SYNTHESIZING VIDEO, SOUND AND TEXT

(75) Inventor: Isao Ikegami, Osaka (JP)

(73) Assignee: Panasonic Corporation, Osaka (JP)

( * ) Notice: Subject to any disclaimer, the term of this patent is extended or adjusted under 35 U.S.C. 154(b) by 660 days.

(21) Appl. No.: 12/441,819

(22) PCT Filed: Sep. 19, 2007

(86) PCT No.: PCT/JP2007/068169
§ 371 (c)(1), (2), (4) Date: Mar. 18, 2009

(87) PCT Pub. No.: WO2008/035704
PCT Pub. Date: Mar. 27, 2008

(65) Prior Publication Data

US 2009/0278986 A1 Nov. 12, 2009

(30) Foreign Application Priority Data

Sep. 21, 2006 (JP) ................................ 2006-256032

(51) Int. Cl.
*H04N 5/445* (2006.01)

(52) U.S. Cl. ......... 348/564; 348/468; 704/211; 704/278

(58) Field of Classification Search ........................ None
See application file for complete search history.

(56) References Cited

U.S. PATENT DOCUMENTS 7,054,804 B2 * 5/2006 Gonzales et al. ................ 704/8
7,117,231 B2 * 10/2006 Fischer et al. ....................... 1/1
2002/0194618 A1 12/2002 Okada et al.
2003/0200091 A1 * 10/2003 Furuyama et al. ............ 704/254
2003/0216922 A1 * 11/2003 Gonzales et al. ............. 704/260
2004/0093220 A1 * 5/2004 Kirby et al. ................... 704/278
2005/0038661 A1 * 2/2005 Momosaki et al. ........... 704/275
2005/0060145 A1 * 3/2005 Abe et al. ...................... 704/211
2005/0086702 A1 * 4/2005 Cormack et al. .............. 725/135
2008/0231750 A1 9/2008 Suzuki

FOREIGN PATENT DOCUMENTS

JP 5-176232 7/1993
JP 7-264545 10/1995
JP 10-22278 8/1998

(Continued)

OTHER PUBLICATIONS

English language Abstract of JP 2004-343488, Dec. 2, 2004.

(Continued)

*Primary Examiner* — Jefferey Harold
*Assistant Examiner* — Sam Huang
(74) *Attorney, Agent, or Firm* — Greenblum & Bernstein, P.L.C.

(57) ABSTRACT

In a closed caption production device, video recognition processing of an input video signal is performed by a video recognizer. This causes a working object in video to be recognized. In addition, a sound recognizer performs sound recognition processing of an input sound signal. This causes a position of a sound source to be estimated. A controller performs linking processing by comparing information of the working object recognized by the video recognition processing with positional information of the sound source estimated by the sound recognition processing. This causes a position of a closed caption produced based on the sound signal to be set in the vicinity of the working object in the video.

10 Claims, 20 Drawing Sheets

200
100 VIDEO AND SOUND INPUT DEVICE
V1 A1
1 BUFFER
9 CLOSED CAPTION SYNTHESIZER
WV
300 VIDEO OUTPUT DEVICE
400 SOUND OUTPUT DEVICE
4 CONTROLLER
4R STORAGE DEVICE
8 VIDEO MEMORY
WS
2 SYNCHRONIZATION SIGNAL DETECTOR
SY
IF1, IF2
CT1, CT2
WC
3 3a VIDEO RECOGNIZER
3b SOUND RECOGNIZER
5 5a VIDEO CLASSIFIER
5b SOUND CLASSIFIER
6 TEXT PRODUCER
7 CHARACTER SYNTHESIZER

FOREIGN PATENT DOCUMENTS

| | | | | |
|---|---|---|---|---|
| JP | 11-261890 | | | 9/1999 |
| JP | 2004-56286 | | | 2/2004 |
| JP | 2004-056286 | A | * | 2/2004 |
| JP | 2004-80069 | | | 3/2004 |
| JP | 2004-343488 | | | 12/2004 |
| JP | 2007-27990 | | | 2/2007 |

OTHER PUBLICATIONS

English language Abstract of JP 5-176232, Jul. 13, 1993.
English language Abstract of JP 2004-80069, Mar. 11, 2004.
English language Abstract of JP 7-264545, Oct. 13, 1995.
English language Abstract of JP 10-22278, Aug. 21, 1998.

* cited by examiner

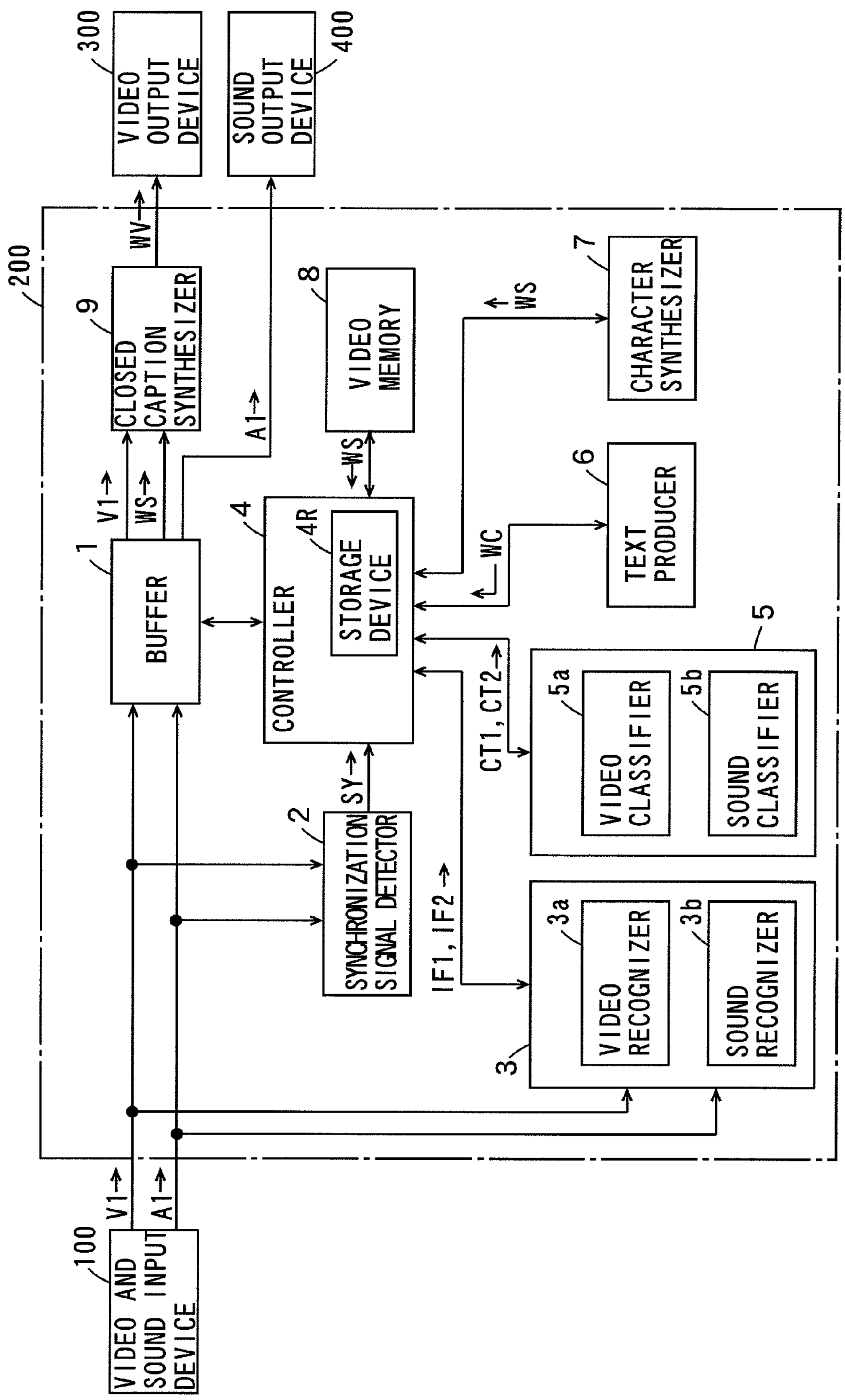
F I G. 1
VIDEO AND SOUND INPUT DEVICE
100
V1
A1
200
BUFFER
1
SYNCHRONIZATION SIGNAL DETECTOR
2
SY
CONTROLLER
4
STORAGE DEVICE
4R
VIDEO RECOGNIZER
3a
SOUND RECOGNIZER
3b
3
IF1, IF2
VIDEO CLASSIFIER
5a
SOUND CLASSIFIER
5b
5
CT1, CT2
TEXT PRODUCER
6
WC
CHARACTER SYNTHESIZER
7
WS
VIDEO MEMORY
8
CLOSED CAPTION SYNTHESIZER
9
WV
VIDEO OUTPUT DEVICE
300
SOUND OUTPUT DEVICE
400

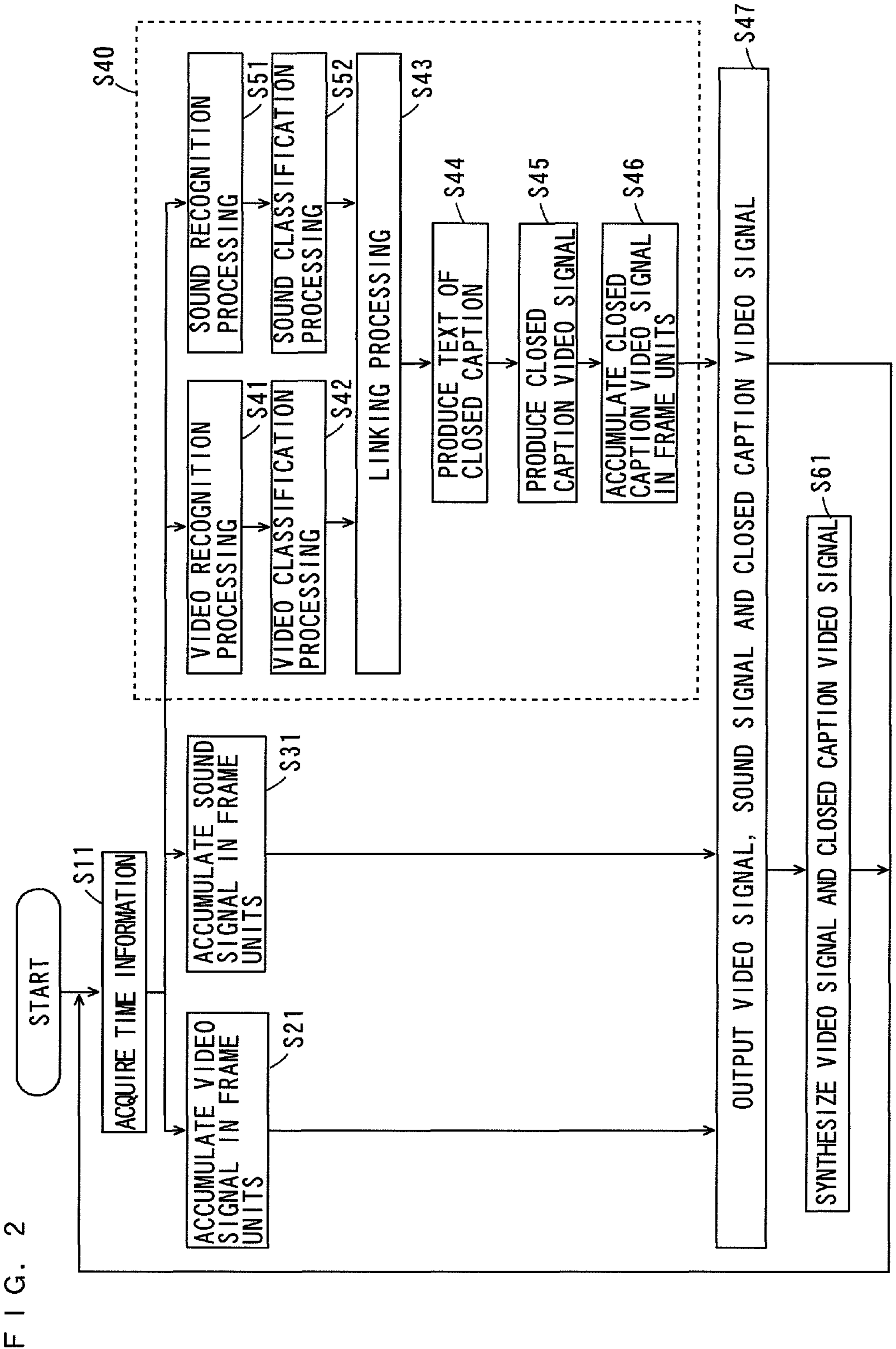
F I G. 2
START
ACQUIRE TIME INFORMATION
S11
ACCUMULATE VIDEO SIGNAL IN FRAME UNITS
S21
ACCUMULATE SOUND SIGNAL IN FRAME UNITS
S31
S40
VIDEO RECOGNITION PROCESSING
S41
VIDEO CLASSIFICATION PROCESSING
S42
SOUND RECOGNITION PROCESSING
S51
SOUND CLASSIFICATION PROCESSING
S52
LINKING PROCESSING
S43
PRODUCE TEXT OF CLOSED CAPTION
S44
PRODUCE CLOSED CAPTION VIDEO SIGNAL
S45
ACCUMULATE CLOSED CAPTION VIDEO SIGNAL IN FRAME UNITS
S46
OUTPUT VIDEO SIGNAL, SOUND SIGNAL AND CLOSED CAPTION VIDEO SIGNAL
S47
SYNTHESIZE VIDEO SIGNAL AND CLOSED CAPTION VIDEO SIGNAL
S61

FIG. 3

(a) VIDEO AND SOUND OUTPUT FROM VIDEO OUTPUT DEVICE AND SOUND OUTPUT DEVICE

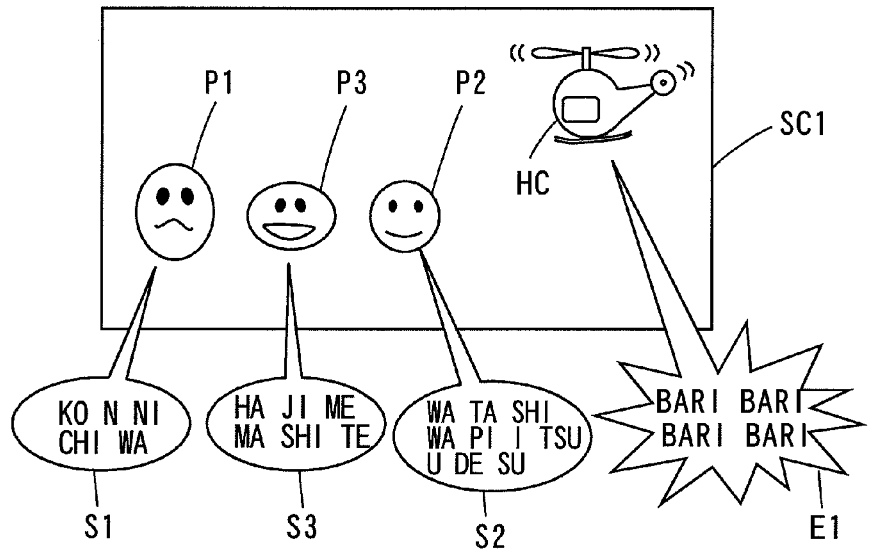

(b) SOUND RECOGNITION INFORMATION PRODUCED BY SOUND RECOGNIZER

IF2

| TYPE OF SOUND | SOUND (CHARACTER CODES) | ESTIMATED POSITION OF SOUND SOURCE |
|---|---|---|
| SOUND EFFECT | | |
| AMBIENT NOISE | BARI BARI BARI BARI | RIGHT END |
| SPEECH | KO N NI CHI WA<br>WA TA SHI WA PI I TSU U DE SU<br>HA JI ME MA SHI TE | LEFT END<br>SLIGHTLY LEFT SIDE<br>CENTER |
| NOISE | | |

(c) SOUND CLASSIFICATION INFORMATION PRODUCED BY SOUND CLASSIFIER

CT2

| PERSON | SOUND (CHARACTER CODES) | TIME PERIOD | DISPLAY COLOR | ESTIMATED POSITION OF SOUND SOURCE |
|---|---|---|---|---|
| PERSON Q1 | KO N NI CHI WA | 10 SECONDS | RED | LEFT END |
| PERSON Q2 | WA TA SHI WA PI I TSU U DE SU | 15 SECONDS | BLUE | SLIGHTLY LEFT SIDE |
| PERSON Q3 | HA JI ME MA SHI TE | 20 SECONDS | YELLOW | CENTER |

FIG. 4
(a) TEXT PRODUCTION TABLE
| PERSON | SOUND (CLOSED CAPTION) | TIME PERIOD | DISPLAY COLOR | DISPLAY COORDINATES |
|---|---|---|---|---|
| PERSON P1 (Q1) | KO N NI CHI WA | 10 SECONDS | RED | (100, 200) |
| PERSON P2 (Q2) | WA TA SHI WA PI I TSU U DE SU | 15 SECONDS | BLUE | (400, 400) |
| PERSON P3 (Q3) | HA JI ME MA SHI TE | 20 SECONDS | YELLOW | (700, 200) |
(b) VIDEO BASED ON CLOSED CAPTION VIDEO SIGNAL
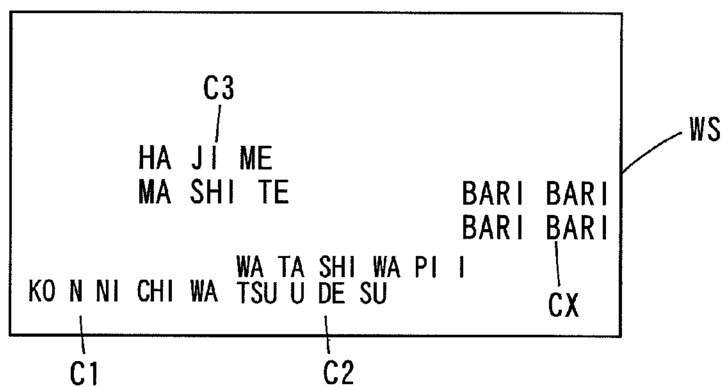
(c) CLOSED CAPTION SYNTHESIZED VIDEO
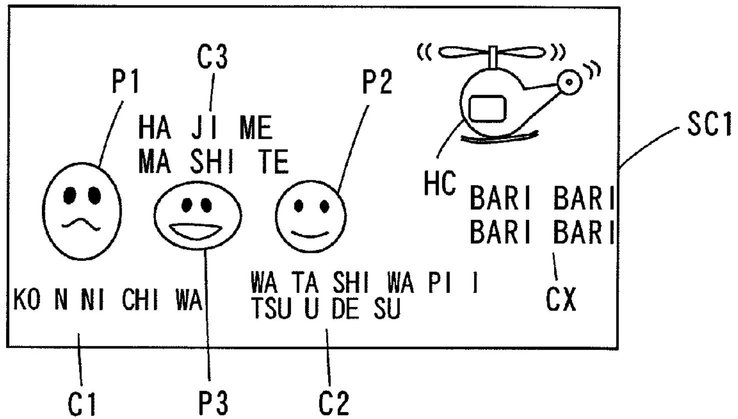

F I G. 5
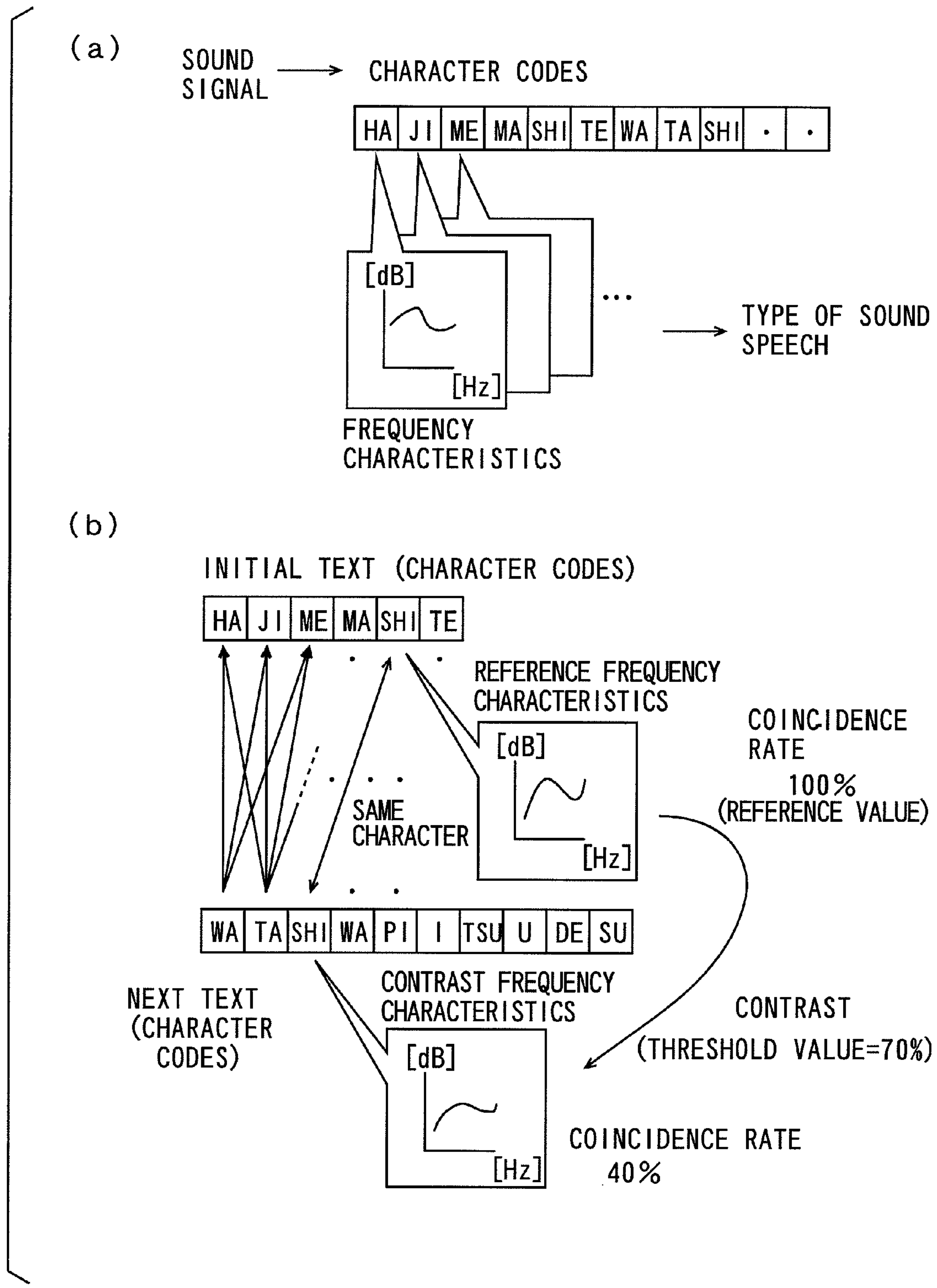

FIG. 6
(a)
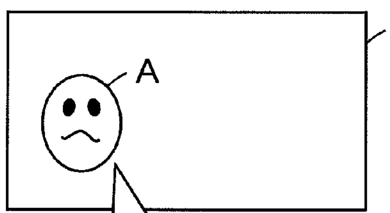
STORE CHARACTER CODES AND FREQUENCY CHARACTERISTICS OF PERSON A IN SOUND CLASSIFICATION TABLE
| PERSON | CHARACTER CODES, FREQUENCY CHARACTERISTICS |
| --- | --- |
| PERSON A | BI I SA N SHI I SA N· · · 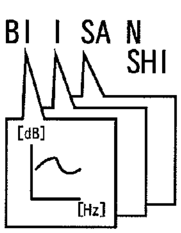 · · · |
(b)
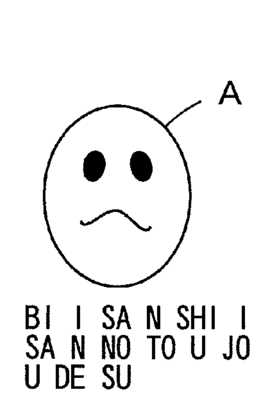

F I G. 7
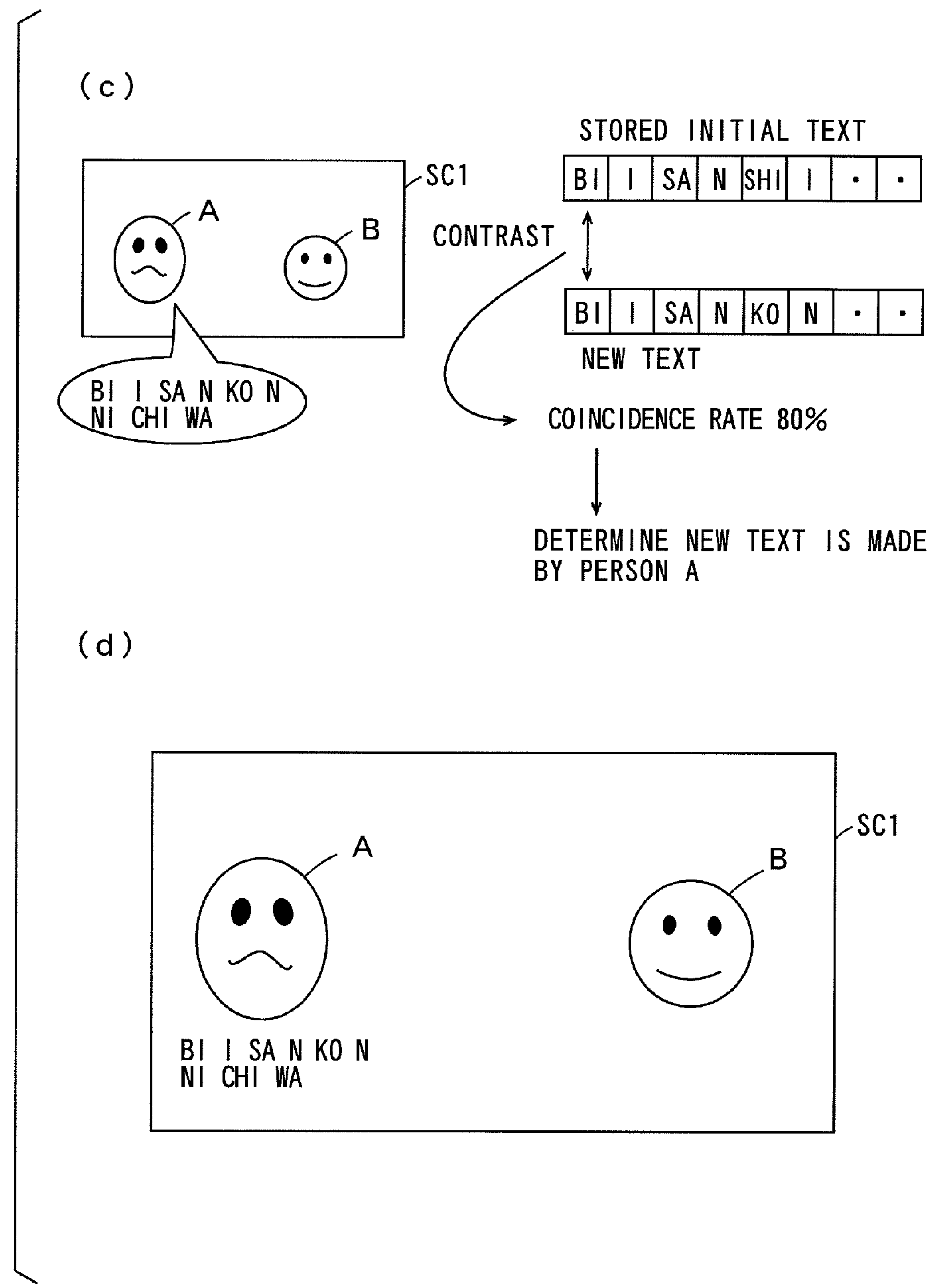

FIG. 8
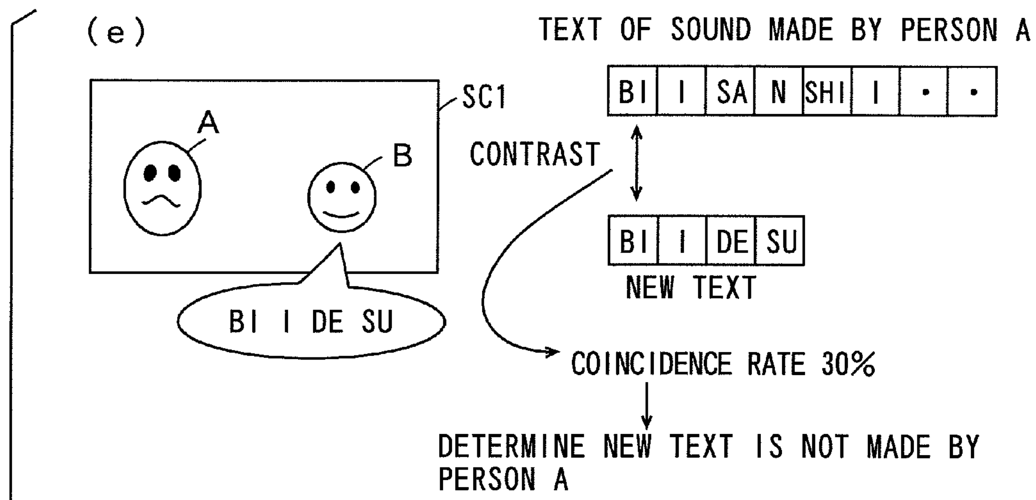
(f) NEWLY STORE CHARACTER CODE AND FREQUENCY CHARACTERISTICS OF PERSON B IN SOUND CLASSIFICATION TABLE
| PERSON | CHARACTER CODES, FREQUENCY CHARACTERISTICS | PERSON | CHARACTER CODES, FREQUENCY CHARACTERISTICS |
|---|---|---|---|
| PERSON A | BI I SA N SHI I SA N · · [dB] [Hz] · · · | PERSON B | BI I DE SU [dB] [Hz] · |
(g)
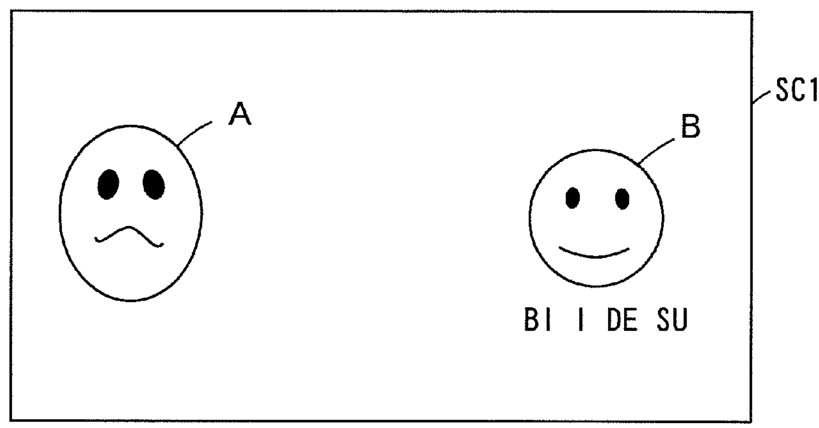

(h)

(i)

NEWLY STORE CHARACTER CODES AND FREQUENCY CHARACTERISTICS OF PERSON C IN SOUND CLASSIFICATION TABLE

| PERSON | CHARACTER CODES, FREQUENCY CHARACTERISTICS | PERSON | CHARACTER CODES, FREQUENCY CHARACTERISTICS |
|---|---|---|---|
| PERSON A | BI I SA N SHI I SA N · · [dB] [Hz] · · · | PERSON C | BI I SA N MA TSU TE · · [dB] [Hz] · · · |
| PERSON B | BI I DE SU [dB] [Hz] · | | |

F I G. 1 1
( I )
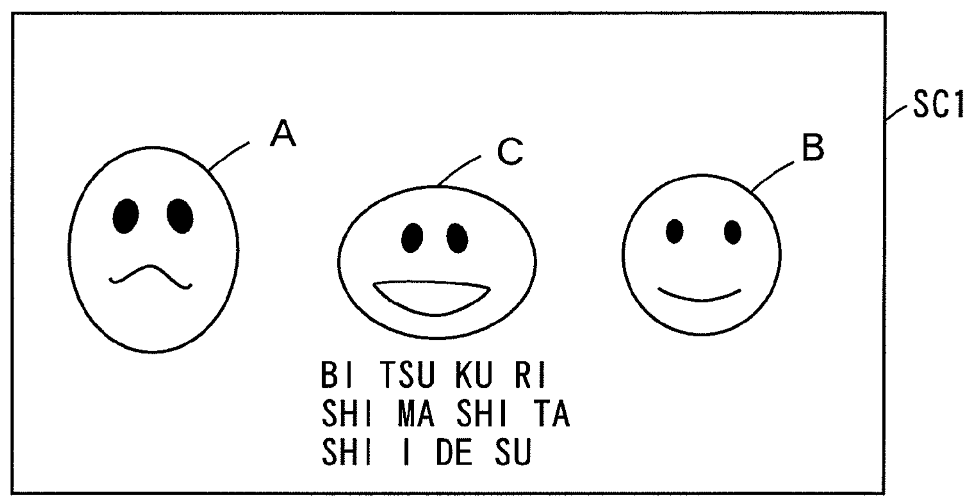

F I G. 1 2
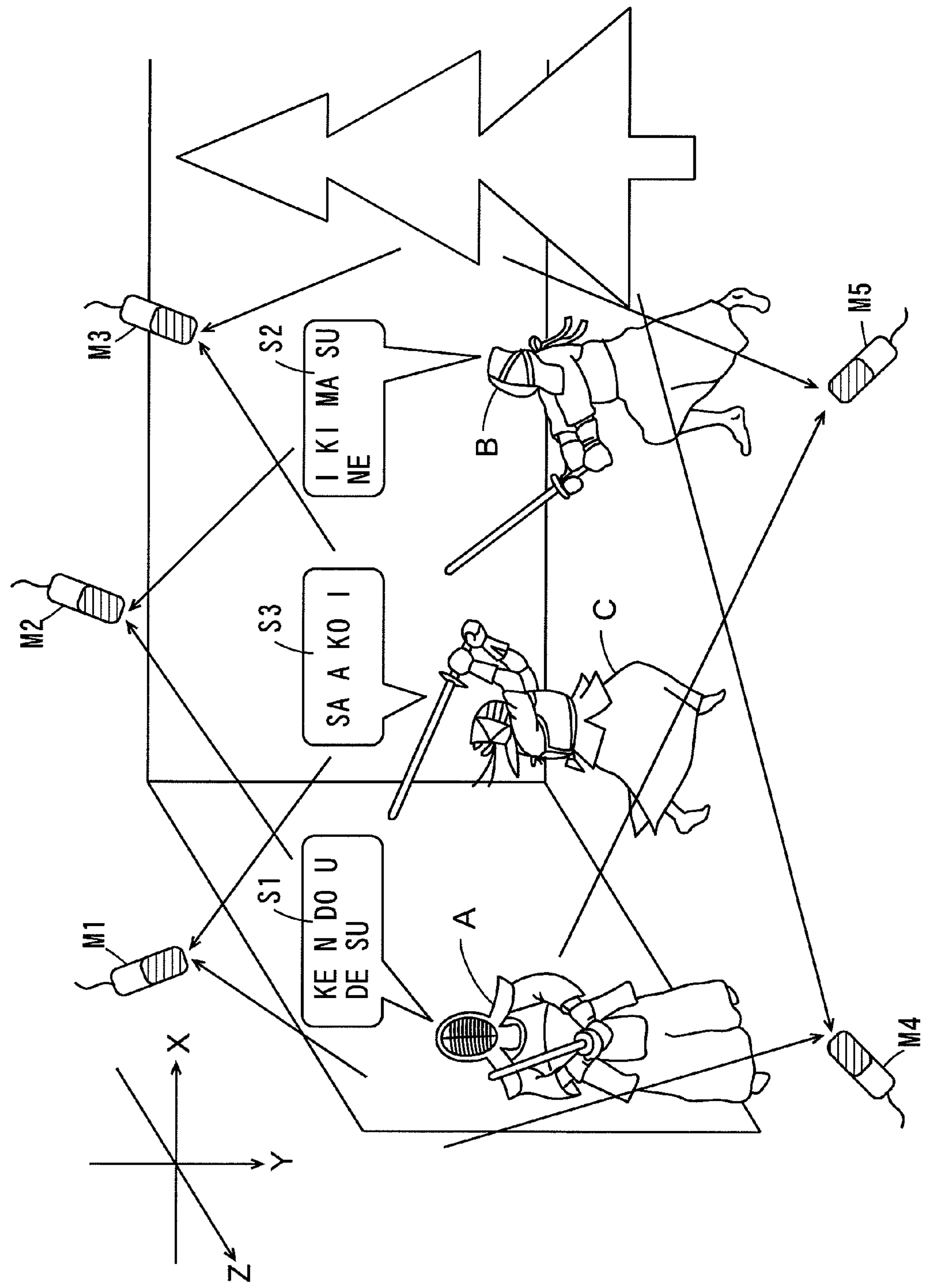

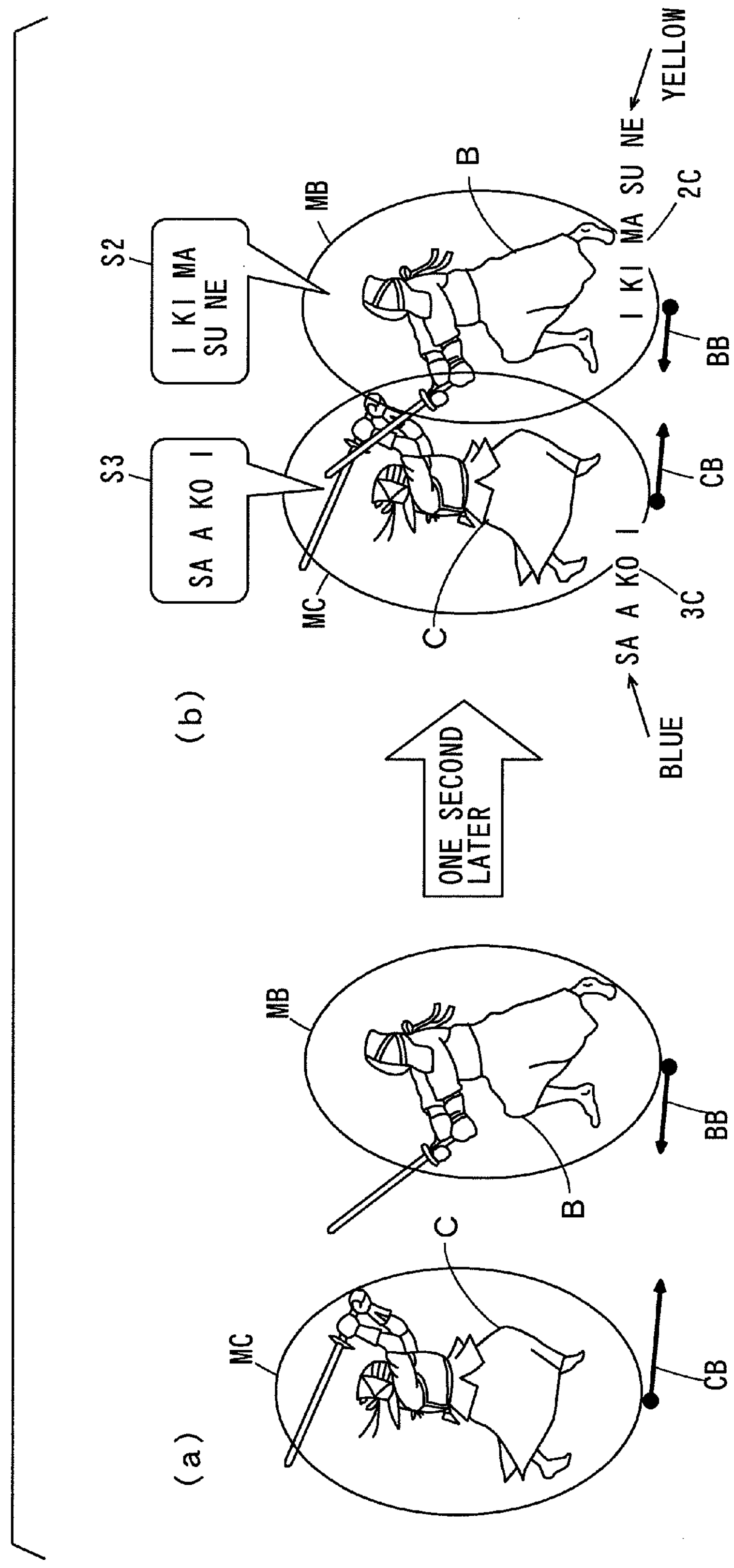
F I G. 1 4
(a)
MC
C
CB
MB
B
BB
ONE SECOND LATER
(b)
S3
SA A KO I
S2
I KI MA
SU NE
MC
C
MB
B
CB
BB
BLUE
SA A KO I
3C
I KI MA SU NE
2C
YELLOW

FIG. 15

(a) ONE EXAMPLE OF SOUND CLASSFICATION TABLE

| PERSON | SOUND (CHARACTER CODES) | TIME PERIOD | DISPLAY COLOR | ESTIMATED POSITION OF SOUND SOURCE |
|---|---|---|---|---|
| PERSON A | KE N DO U DE SU | 10 SECONDS | RED | LEFT END |
| PERSON B | I KI MA SU NE | 15 SECONDS | BLUE | SLIGHTLY RIGHT SIDE |
| PERSON C | SA A KO I | 20 SECONDS | YELLOW | CENTER |

(b) ONE EXAMPLE OF VIDEO CLASSIFICATION TABLE

| WORKING OBJECT | AREA OF DISPLAY REGION (NUMBER OF DOTS) | POSITION OF CENTER OF GRAVITY | SPEED |
|---|---|---|---|
| PERSON A | 30000 | (100, 200) | |
| PERSON B | 23000 | (400, 400) | |
| PERSON C | 22000 | (500, 200) | |

(c) TEXT PRODUCTION TABLE

| PERSON | SOUND (CLOSED CAPTION TEXT) | TIME PERIOD | DISPLAY COLOR | CLOSED CAPTION POSITION (DISPLAY COORDINATES) |
|---|---|---|---|---|
| PERSON A | KE N DO U DE SU | 10 SECONDS | RED | (100, 100) |
| PERSON B | I KI MA SU NE | 15 SECONDS | BLUE | (300, 300) |
| PERSON C | SA A KO I | 20 SECONDS | YELLOW | (700, 100) |

(a) TEXT PRODUCTION TABLE

| PERSON | SOUND (CLOSED CAPTION TEXT) | TIME PERIOD | DISPLAY COLOR | CLOSED CAPTION POSITION (DISPLAY COORDINATES) |
|---|---|---|---|---|
| PERSON A | KE N DO U DE SU | 10 SECONDS | RED | LEFT END : (100, 100) |
| PERSON B | I KI MA SU NE | 15 SECONDS | BLUE | CENTER : (300, 300) |
| PERSON C | SA A KO I | 20 SECONDS | YELLOW | RIGHT END : (700, 400) |

(b)

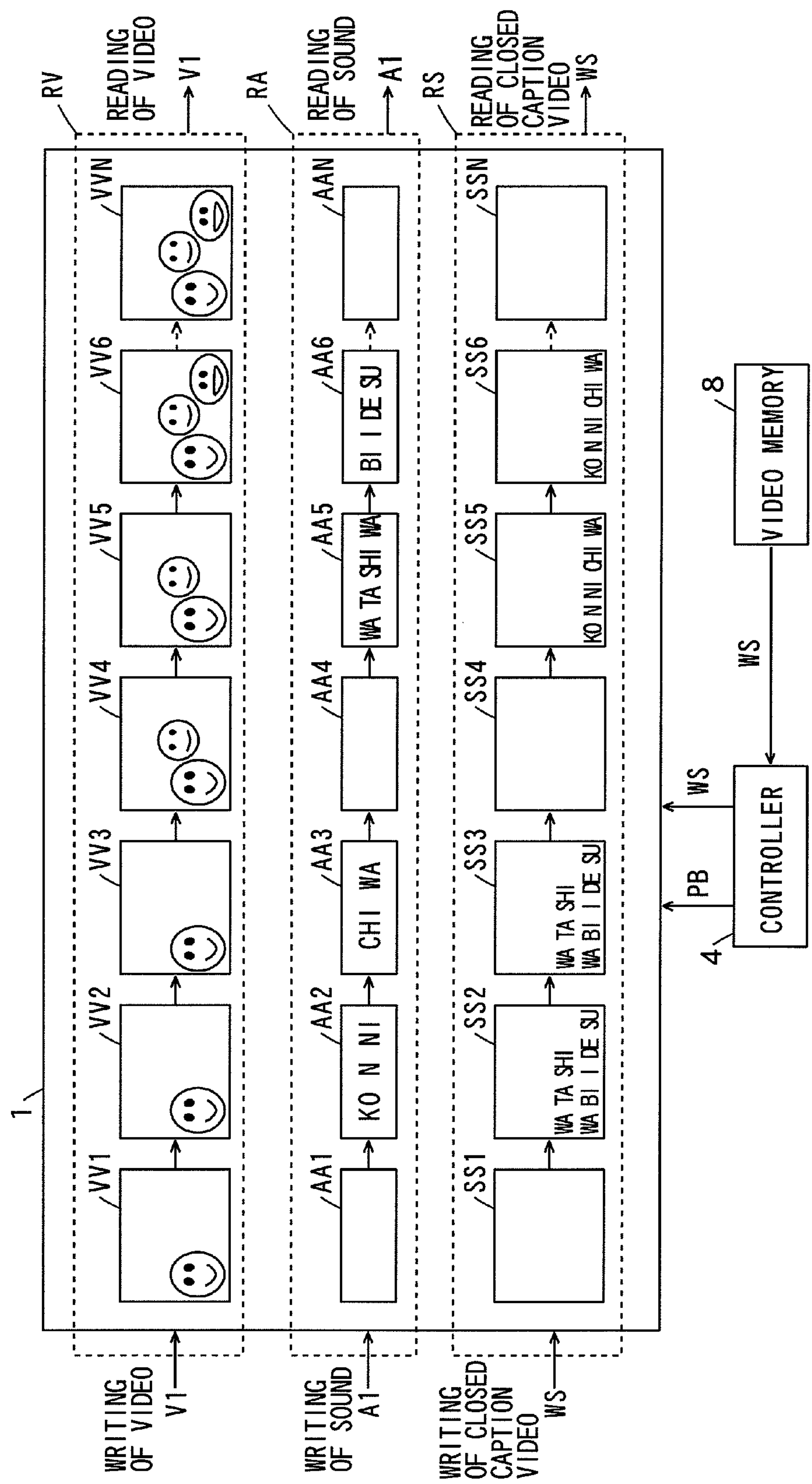
F I G. 1 7
1
RV
RA
RS
WRITING OF VIDEO V1
WRITING OF SOUND A1
WRITING OF CLOSED CAPTION VIDEO WS
READING OF VIDEO V1
READING OF SOUND A1
READING OF CLOSED CAPTION VIDEO WS
VV1
VV2
VV3
VV4
VV5
VV6
VVN
AA1
AA2
KO N NI
AA3
CHI WA
AA4
AA5
WA TA SHI WA
AA6
BI I DE SU
AAN
SS1
SS2
WA TA SHI WA BI I DE SU
SS3
WA TA SHI WA BI I DE SU
SS4
SS5
KO N NI CHI WA
SS6
KO N NI CHI WA
SSN
PB
WS
CONTROLLER
4
WS
VIDEO MEMORY
8

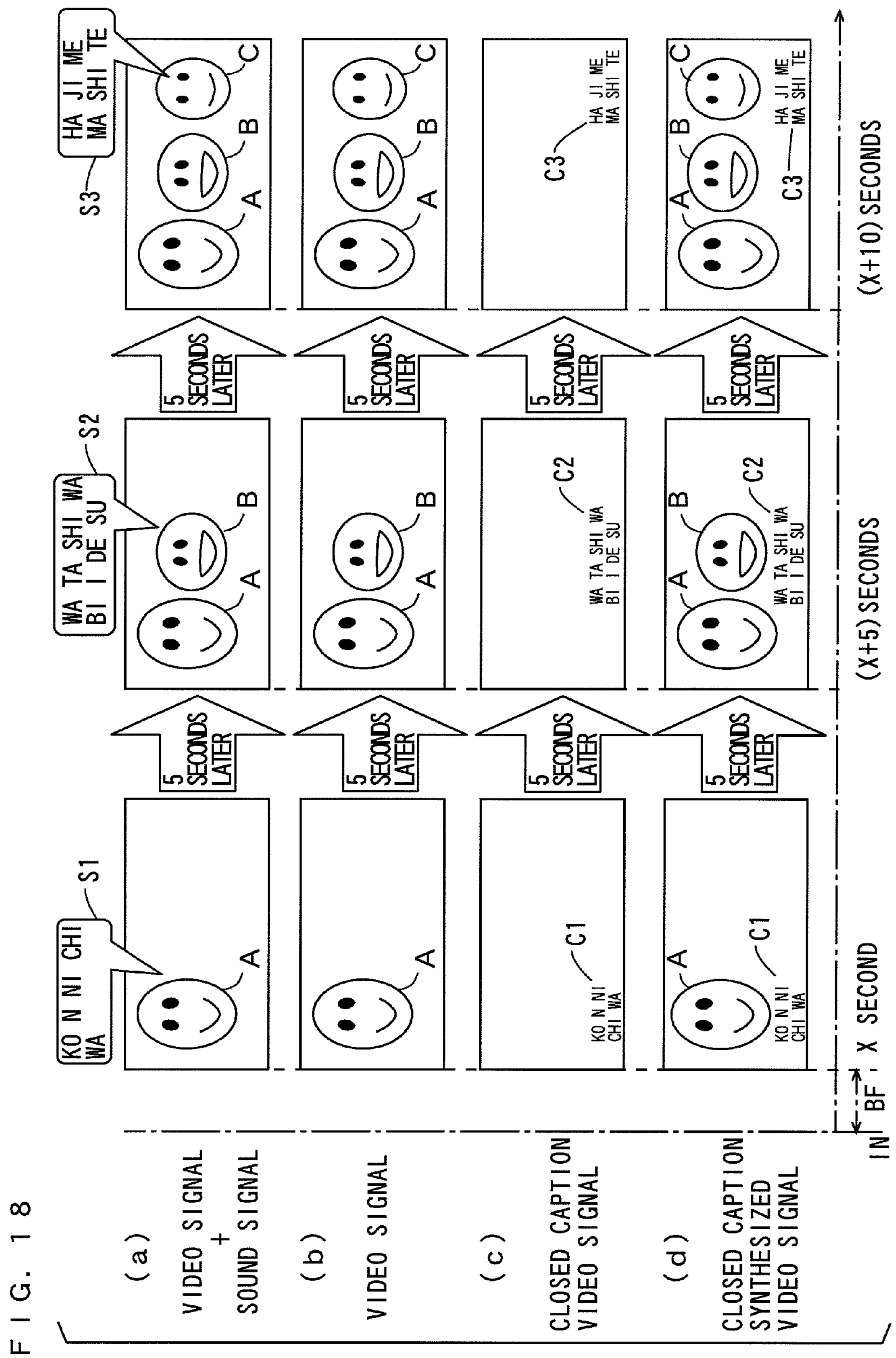
F I G. 1 8
(a) VIDEO SIGNAL + SOUND SIGNAL
(b) VIDEO SIGNAL
(c) CLOSED CAPTION VIDEO SIGNAL
(d) CLOSED CAPTION SYNTHESIZED VIDEO SIGNAL
IN
BF
X SECOND
(X+5) SECONDS
(X+10) SECONDS
5 SECONDS LATER
KO N NI CHI WA
WA TA SHI WA BI I DE SU
HA JI ME MA SHI TE
S1
S2
S3
C1
C2
C3
A
B
C

FIG. 19

EPG

| No | NAME OF PROGRAM | GENRE |
|---|---|---|
| 1 | NEWS 8 O'CLOCK | NEWS |
| 2 | DRAMA CITY 9 | DRAMA |
| 3 | COMEDY PARK | VARIETY SHOW |
| 4 | MOVIE THEATER "MARU" | CINEMA |

FIG. 20
PRIOR ART
(a)
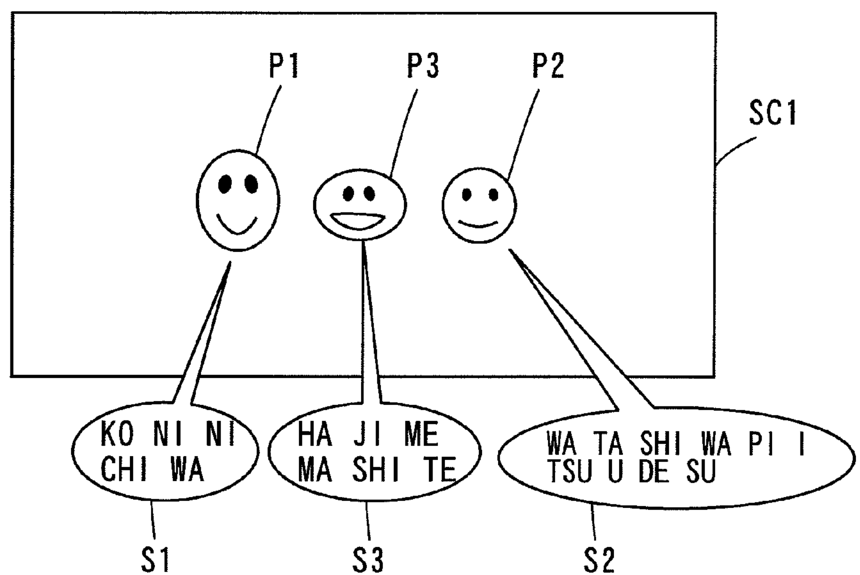
(b)
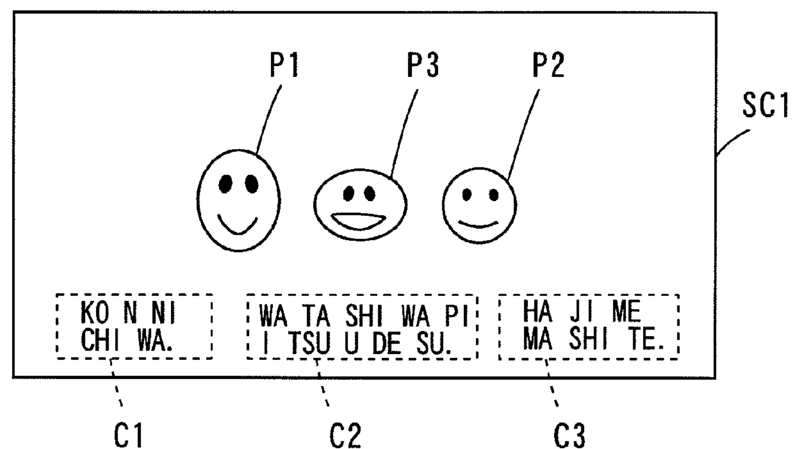

CLOSED CAPTION PRODUCTION DEVICE, METHOD AND PROGRAM FOR SYNTHESIZING VIDEO, SOUND AND TEXT

TECHNICAL FIELD

The present invention relates to a closed-caption production device that produces closed-captions, a closed-caption production method and a closed-caption production program.

BACKGROUND ART

Conventionally, closed-caption broadcasting that causes closed captions to be displayed for users including people with hearing difficulties along with video and sound of a television program has been performed.

The closed-caption broadcasting is applied only in specific television programs that are organized by broadcasting stations. Thus, the users cannot be offered presentation of the closed captions in television programs not corresponding to the closed caption broadcasting.

Therefore, Patent Document 1 discloses a closed-caption superimposition device that displays video, to which closed captions are added based on video signals and sound signals. The closed caption superimposition device acquires the sound signals by receiving broadcasting signals while converting the sound signals into character codes by sound recognition. Then, the closed caption superimposition device produces the closed captions (character pattern data) from the converted character codes, and superimposes the produced closed captions on the video signals.

This allows the users to be offered presentation of the closed captions in all television programs whether or not those television programs correspond to the closed caption broadcasting.

[Patent Document 1] JP 5-176232 A

DISCLOSURE OF THE INVENTION

Problems to be Solved by the Invention

When the closed captions are produced from the sound signals by the closed-caption superimposition device of Patent Document 1, however, there arise a problem described in the following.

FIG. 20 is a diagram for explaining the problem in the conventional closed caption superimposition device. FIG. 20(*a*) shows a screen SC1 on which a plurality of persons P1, P2, P3 are displayed and speeches S1, S2, S3 made by respective persons.

As shown in FIG. 20(*a*), the plurality of persons P1, P3, P2 align from the left on the screen SC1 in the order of the reference numerals. In addition, the speeches S1, S2, S3 are output from a sound output device that is not shown in the order of the reference numerals in FIG. 20(*a*).

That is, the person P1 on the left firstly utters "KO N NI CHI WA" as a speech S1, the person P2 on the right then utters "WA TA SHI WA PI I TSU U DE SU" as a speech S2, and the person P3 at the center finally utters "HA JI ME MA SHI TE" as a speech S3.

Here, the foregoing closed caption superimposition device cannot associate the three persons P1, P2, P3 with the speeches S1, S2, S3 that are made by the respective persons to perform recognition.

In this case, character strings C1, C2, C3 produced from the speeches S1, S2, S3 as closed captions align from the left of the screen in this order (the order of the reference numerals) on the screen regardless of a positional relationship among the persons P1, P2, P3 as shown in FIG. 20(*b*).

Thus, when the users visually recognize the screen SC1, the users will find the positional relationship among the persons P1, P2, P3 aligning on the screen is different from a positional relationship among the character strings C1, C2, C3. This makes it difficult for the users to recognize correspondences among the persons P1, P2, P3 and the character strings C1, C2, C3.

For example, the users may erroneously recognize that the person P1 utters "KO N NI CHI WA", the person P3 utters "WA TA SHI WA PI I TSU U DE SU", and the person P2 utters "HA JI ME MA SHI TE" by visually recognizing the screen SC1 shown in FIG. 20(*b*).

As described above, it is difficult for the users to accurately recognize correspondences between sound sources and character strings displayed as the closed captions in the closed caption superimposition device of Patent Document 1.

An object of the present invention is to provide a closed caption production device with which the users can reliably and easily recognize correspondence between the sound sources and the closed captions produced based on the sound, a closed caption production method and a closed caption production program.

Means for Solving the Problems (1) According to an aspect of the present invention, a closed caption production device that produces synthesized video including video of a sound generating object that generates sound and a closed caption of the sound generated from the sound generating object based on a video signal and a sound signal includes a video recognition means that acquires information related to the video of the sound generating object as video information based on the video signal, a video position detection means that detects a display position of the video of the sound generating object based on the video information acquired by the video recognition means, a sound recognition means that acquires information related to the sound of the sound generating object as sound information based on the sound signal, a sound position estimation means that estimates a generation position of the sound of the sound generating object based on the sound information acquired by the sound recognition means, a closed caption production means that produces a closed caption that represents by a character the sound generated from the sound generating object based on the sound information acquired by the sound recognition means, an association means that associates the display position of the video of the sound generating object detected by the video position detection means and the generation position of the sound of the sound generating object estimated by the sound position estimation means, and a synthesized video production means that produces the synthesized video by arranging the closed caption produced by the closed caption production means in a position corresponding to the display position of the video detected by the video position detection means based on the display position of the video and the generation position of the sound that have been associated with each other by the association means.

In the closed caption production device, the information related to the video of the sound generating object is acquired from the video signal as the video information, and the display position of the video of the sound generating object is detected based on the acquired video information.

Moreover, the information related to the sound of the sound generating object is acquired from the sound signal as the sound information, and the generation position of the sound of the sound generating object is estimated based on the acquired sound information. Furthermore, the closed caption of the sound generated from the sound generating object is produced based on the acquired sound information.

Here, the detected display position of the video of the sound generating object and the estimated generation position of the sound of the sound generating object are associated with each other by the association means.

The closed caption of the sound generated from the sound generating object is arranged in the position corresponding to the display position of the video of the sound generating object based on the display position of the video and the generation position of the sound that have been associated with each other, so that the synthesized video is produced.

This allows the users of the closed caption production device to easily and reliably recognize the video of the sound generating object and the closed caption of the sound generated from the sound generating object by visually recognizing the synthesized video.

(2) The sound generating object may include a plurality of working objects, the video recognition means may acquire the information related to the video of each working object as the video information based on the video signal, the video position detection means may detect the display position of the video of each working object based on the video information acquired by the video recognition means, the sound recognition means may recognize each working object and associates the sound information that has been acquired with each working object that has been recognized, the sound position estimation means may estimate the generation position of the sound of each working object based on the sound information associated with each working object by the sound recognition means, the closed caption production means may produce the closed caption that represents by the character the sound generated from each working object based on the sound information acquired by the sound recognition means, the association means may associate the display position of the video of each working object detected by the video position detection means with the generation position of the sound of each working object estimated by the sound position estimation means, and the synthesized video production means may produce the synthesized video by arranging the closed caption of the sound generated from each working object produced by the closed caption production means in the position corresponding to the display position of the video of each working object detected by the video position detection means based on the display position of the video of each working object and the generation position of the sound of each working object that are associated with each other by the association means.

In this case, the information related to the video of the plurality of working objects is acquired from the video signal as the video information, and the display position of the video of each working object is detected based on the acquired video information.

Moreover, each working object is recognized by the sound recognition means, the acquired sound information is associated with each working object that has been recognized, and the generation position of the sound of each working object is estimated based on the sound information associated with each working object. Furthermore, the closed caption of the sound generated from each working object is produced based on the acquired sound information.

Here, the display position of the video of each working object that has been detected and the generation position of the sound of each working object that has been estimated are associated with each other by the association means.

The closed caption of the sound generated from each working object is arranged in the position corresponding to the display position of the video of each working object based on the display position of the video and the generation position of the sound that are associated with each other, so that the synthesized video is produced.

Accordingly, the users of the closed caption production device can easily and reliably recognize the closed caption of the sound corresponding to the video of each working object by visually recognizing the synthesized video even when the sound is generated from the plurality of working objects.

(3) The position corresponding to the display position of the video of each working object may be set such that a distance between the display position of the video of each working object and a display position of the closed caption of the sound of the working object is shorter than a distance between the display position of the video of the working object and a display position of a closed caption of sound of another working object.

In this case, the closed caption of the sound of each working object is displayed in the synthesized video produced by the synthesized video production means such that the distance between the display position of the video of each working object and the display position of the closed caption of the sound of the working object is shorter than the distance between the display position of the video of the working object and the display position of the closed caption of the sound of the another working object.

Accordingly, the users of the closed caption production device can easily and reliably recognize the closed caption of the sound corresponding to the video of each working object by visually recognizing the synthesized video.

(4) The plurality of working objects may include a plurality of persons, and the sound information may include information related to frequency characteristics of the sound generated from each person, and the sound recognition means may recognize each person that generates the sound based on the information related to the frequency characteristics of the sound.

In this case, the frequency characteristics of the sound generated from each person is acquired as the sound information by the sound recognition means. Each person has his/her own frequency characteristics of the sound. Thus, the information related to the frequency characteristics of the sound is used, so that each person that generates the sound can be accurately recognized.

(5) The sound recognition means may recognize each person that generates the sound by comparing the information related to the frequency characteristics of the sound that is newly acquired with the information related to the frequency characteristics of the sound that was previously acquired.

In this case, the information related to the frequency characteristics of the sound that is newly acquired and the information related to the frequency characteristics of the sound that was previously acquired are compared with each other. Recognition of each person that generates the sound is performed based on comparison results, thereby causing each person to be easily recognized.

(6) The sound recognition means may recognize each person that generates the sound by determining whether or not a degree of coincidence indicating a level of coincidence between the information related to the frequency characteristics of the sound that is newly acquired and the information related to the frequency characteristics of the sound that was previously acquired exceeds a predetermined reference value.

In this case, the level of coincidence between the information related to the frequency characteristics of the sound that is newly acquired with the information related to the frequency characteristics of the sound that was previously acquired is indicated by the degree of coincidence.

Judgment as to whether or not the degree of coincidence exceeds the predetermined reference value is made, thereby determining whether or not the information related to the frequency characteristics of the sound that is newly acquired coincides with the information related to the frequency characteristics of the sound that was previously acquired. Thus, adjustment of the reference value allows accuracy of recognizing each person to be adjusted.

(7) The video information may include information related to a shape and a size of the video of each working object, and the video recognition means may recognize each working object based on the information related to the shape and the size of the video of each working object and associate the video information that has been acquired with each working object that has been recognized.

In this case, each working object is recognized based on the information related to the shape and the size of the video of each working object by the video recognition means.

As described above, the information related to the shape and the size of the video of each working object is used, so that each working object is accurately recognized. Accordingly, the acquired video information is accurately associated with each working object that has been recognized.

(8) The video information may include information related to a speed of the video of each working object, the video recognition means may estimate a display position, after an elapse of a predetermined period of time, of the video of each working object based on the information related to the speed of the video of each working object, and the synthesized video production means may produce the synthesized video by arranging the closed caption of the sound of each working object produced by the closed caption production means in a position corresponding to the display position, after the elapse of the predetermined period of time, of the video of each working object that has been estimated.

In this case, the display position of the video of each working object after the elapse of the predetermined period of time is estimated based on the information related to the speed of the video of each working object. Then, the synthesized video in which the closed caption of the sound of the working object is arranged in the position corresponding to the display position of the video that has been estimated is produced.

Accordingly, the users of the closed caption production device can easily and reliably recognize the closed caption of the sound corresponding to the video of each working object in the synthesized video even in a case where the plurality of working objects move, since the closed caption is displayed in the position corresponding to the previously estimated position to which each working object moves.

(9) The closed caption production means may produce the closed caption that represents the sound generated from each of the plurality of working objects by the character with a different color for each working object. In this case, the users of the closed caption production device can more easily and reliably recognize the closed caption of the sound corresponding to the video of each working object by visually recognizing the synthesized video, since the sound generated from each working object is represented by the different color.

(10) Each of the video signal and sound signal may include time information, and the synthesized video production means may arrange in video the closed caption that has been produced at a timing where the sound is generated from the sound generating object based on the time information of each of the video signal and the sound signal to produce the synthesized video such that an output timing of the sound by the sound signal and a display timing of the closed caption coincide with each other.

In this case, the produced closed caption is arranged in the video based on the time information of the video signal and the sound signal, so that the synthesized video in which the output timing of the sound by the sound signal and the display timing of the closed caption coincide with each other is produced. This reliably causes the users of the closed caption production device to visually recognize the closed caption at the timing where the sound is generated from the sound generating object.

(11) Each of the video signal and sound signal may include genre information indicating a genre of a program composed of video and sound, the closed caption production device may further include a genre determination means that determines the genre of the program by detecting the genre information, and an adjustment means that adjusts an acquiring operation of the video information by the video recognition means, a detecting operation of the display position of the video of the sound generating object by the video position detection means, an acquiring operation of the sound information of the sound generating object by the sound recognition means, and an estimating operation of the generation position of the sound of the sound generating object by the sound position estimation means.

In this case, the genre of the program is determined by the genre determination means based on the genre information. The acquiring operation of the video information by the video recognition means, the detecting operation of the display position of the video of the sound generating object by the video position detection means, the acquiring operation of the sound information of the sound generating object by the sound recognition means and the estimating operation of the generation position of the sound of the sound generating object by the sound position estimation means are adjusted by the adjustment means depending on the determined genres.

As described above, the characteristics of the video and sound constituting a program are different depending on the genre of the program. The acquiring operation of the video information is adjusted depending on the genre of the program, so that the video information can be acquired with high accuracy.

Moreover, the detecting operation of the display position of the video of the sound generating object by the video position detection means is adjusted depending on the genre of the program, so that the display position of the video of the sound generating object can be detected with high accuracy.

Furthermore, the acquiring operation of the sound information of the sound generating object by the sound recognition means is adjusted depending on the genre of the program, so that the sound information can be acquired with high accuracy.

In addition, the estimating operation of the generation position of the sound of the sound generating object by the sound position estimation means is adjusted depending on the genre of the program, so that the generation position of the sound of the sound generating object can be estimated with high accuracy.

(12) According to another aspect of the present invention, a closed caption production method for producing synthesized video including video of a sound generating object that generates sound and a closed caption of the sound generated from the sound generating object based on a video signal and a sound signal includes the steps of acquiring information related to the video of the sound generating object as video information based on the video signal, detecting a display position of the video of the sound generating object based on the video information that has been acquired, acquiring information related to the sound of the sound generating object as sound information based on the sound signal, estimating a generation position of the sound of the sound generating object based on the sound information that has been acquired, producing a closed caption that represents by a character the sound generated from the sound generating object based on the sound information that has been acquired, associating the display position of the video of the sound generating object that has been detected and the generation position of the sound of the sound generating object that has been estimated, and producing the synthesized video by arranging the closed caption that has been produced in a position corresponding to the display position of the video that has been detected based on the display position of the video and the generation position of the sound that have been associated with each other.

According to the closed caption production method, the information related to the video of the sound generating object is acquired from the video signal as the video information, and the display position of the video of the sound generating object is detected based on the acquired video information.

Moreover, the information related to the sound of the sound generating object is acquired from the sound signal as the sound information, and the generation position of the sound of the sound generating object is estimated based on the acquired sound information. Furthermore, the closed caption of the sound generated from the sound generating object is produced based on the acquired sound information.

Here, the detected display position of the video of the sound generating object and the estimated generation position of the sound of the sound generating object are associated with each other.

The closed caption of the sound generated from the sound generating object is arranged in the position corresponding to the display position of the video of the sound generating object based on the display position of the video and the generation position of the sound that have been associated with each other, so that the synthesized video is produced.

This allows the users of the closed caption production device to easily and reliably recognize the video of the sound generating object and the closed caption of the sound generated from the sound generating object by visually recognizing the synthesized video.

(13) According to still another aspect of the present invention, a closed caption production program that can be read by a processing device and that produces synthesized video including video of a sound generating object that generates sound and a closed caption of the sound generated from the sound generating object based on a video signal and a sound signal causes the processing device to execute the processes of acquiring information related to the video of the sound generating object as video information based on the video signal, detecting a display position of the video of the sound generating object based on the video information that has been acquired, acquiring information related to the sound of the sound generating object as sound information based on the sound signal, estimating a generation position of the sound of the sound generating object based on the sound information that has been acquired, producing a closed caption that represents by a character the sound generated from the sound generating object based on the sound information that has been acquired, associating the display position of the video of the sound generating object that has been detected and the generation position of the sound of the sound generating object that has been estimated, and producing the synthesized video by arranging the closed caption that has been produced in a position corresponding to the display position of the video that has been detected based on the display position of the video and the generation position of the sound that have been associated with each other.

According to the closed caption production program, the information related to the video of the sound generating object is acquired from the video signal as the video information, and the display position of the video of the sound generating object is detected based on the acquired video information.

Moreover, the information related to the sound of the sound generating object is acquired from the sound signal as the sound information, and the generation position of the sound of the sound generating object is estimated based on the acquired sound information. Furthermore, the closed caption of the sound generated from the sound generating object is produced based on the acquired sound information.

Here, the detected display position of the video of the sound generating object and the estimated generation position of the sound of the sound generating object are associated with each other.

The closed caption of the sound generated from the sound generating object is arranged in the position corresponding to the display position of the video of the sound generating object based on the display position of the video and the generation position of the sound that have been associated with each other, so that the synthesized video is produced.

This allows the users of the closed caption production device to easily and reliably recognize the video of the sound generating object and the closed caption of the sound generated from the sound generating object by visually recognizing the synthesized video.

Effects of the Invention

According to the closed caption production device, the closed caption production method and the closed caption production program of the present invention, the display position of the video of the sound generating object is detected based on the video signal, and the generation position of the sound of the sound generating object is estimated based on the sound signal. Then, the detected display position of the video of the sound generating object and the estimated generation position of the sound of the sound generating object are associated with each other.

The closed caption of the sound generated from the sound generating object is arranged in the position corresponding to the display position of the video of the sound generating object based on the display position of the video and the generation position of the sound that have been associated with each other, so that the synthesized video is produced.

Accordingly, the users of the closed caption production device can easily and reliably recognize the video of the sound generating object and the closed caption of the sound generated from the sound generating object by visually recognizing the synthesized video.

BRIEF DESCRIPTION OF THE DRAWINGS

FIG. 1 is a block diagram for explaining the configuration of a closed caption production device according to one embodiment of the present invention.

FIG. 2 is a flowchart showing a series of operations performed by the closed caption production device of FIG. 1.

FIG. 3 is a diagram for explaining sound recognition information and sound classification information.

FIG. 4 is a diagram for explaining a text production table, video based on a closed caption video signal, and closed caption synthesized video.

FIG. 5 is a diagram showing one example of sound recognition processing by a sound recognizer of FIG. 1 and sound classification processing by a sound classifier of FIG. 1.

FIG. 6 is a diagram for explaining one example of the sound recognition processing and the sound classification processing performed in the closed caption production device of FIG. 1 when a plurality of persons make speeches.

FIG. 7 is a diagram for explaining the one example of the sound recognition processing and the sound classification processing performed in the closed caption production device of FIG. 1 when the plurality of persons make the speeches.

FIG. 8 is a diagram for explaining the one example of the sound recognition processing and the sound classification processing performed in the closed caption production device of FIG. 1 when the plurality of persons make the speeches.

FIG. 11 is a diagram for explaining the one example of the sound recognition processing and the sound classification processing performed in the closed caption production device of FIG. 1 when the plurality of persons make the speeches.

FIG. 12 is a diagram for explaining one example of a method of recording sound for producing surround sound signals.

FIG. 14 is a diagram for explaining an example of setting closed caption positions by a text producer of FIG. 1.

FIG. 15 is a diagram showing an example of producing a sound classification table, a video classification table and a text production table by the closed caption production device.

FIG. 17 is a conceptual diagram showing how a video signal, a sound signal and the closed caption video signal of FIG. 1 are accumulated in a buffer 1 of FIG. 1.

FIG. 18 is a diagram showing an example of producing a closed caption synthesized video signal by a closed caption synthesizer of FIG. 1.

FIG. 19 is a diagram showing one example of EPG data.

FIG. 20 is a diagram for explaining a problem in a conventional closed caption superimposition device.

BEST MODE FOR CARRYING OUT THE INVENTION

Figure 9:
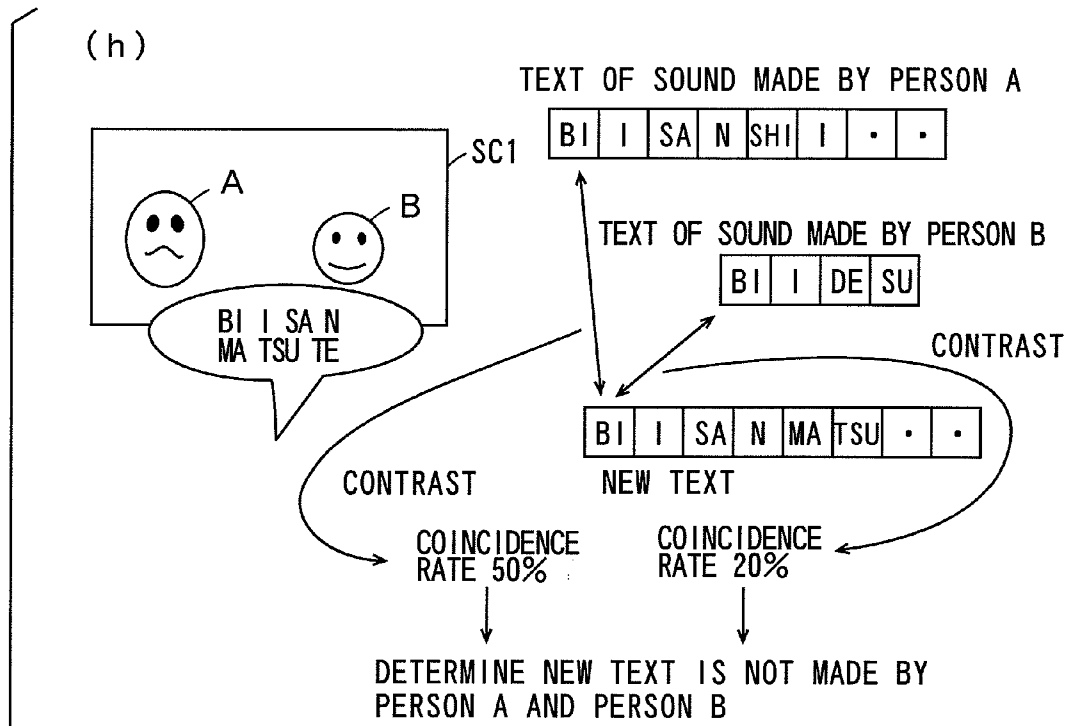
FIG. 9 is a diagram for explaining the one example of the sound recognition processing and the sound classification processing performed in the closed caption production device of FIG. 1 when the plurality of persons make the speeches.

Hereinafter, a closed caption production device according to one embodiment of the present invention will be described.

(1) Configuration of Closed Caption Production Device

FIG. 1 is a block diagram for explaining the configuration of a closed caption production device according to one embodiment of the present invention. As shown in FIG. 1, a video and sound input device 100, a video output device 300 and a sound output device 400 are connected to the closed caption production device 200 according to the one embodiment of the present invention.

The video and sound input device 100 is a broadcast reception device including a tuner, for example. In this case, the video and sound input device 100 receives a digital broadcast to extract a broadcast signal of a selected broadcast station, and separates a video signal V1 and a sound signal A1 from the broadcast signal. Note that the video and sound input device 100 may receive an analog broadcast.

The video and sound input device 100 provides the video signal V1 and the sound signal A1 to the closed caption production device 200. The closed caption production device 200 produces a closed caption video signal WS based on the provided video signal V1 and sound signal A1 to superimpose the closed caption video signal WS on the video signal V1. Thus, a closed caption synthesized video signal WV is produced.

The closed caption production device 200 outputs the closed caption synthesized video signal WV to the video output device 300. In addition, the closed caption production device 200 outputs the sound signal Al synchronized with the closed caption synthesized video signal WV to the sound output device 400.

The video output device 300 is composed of a liquid crystal display panel or a plasma display panel, for example. This causes video to which a closed caption is added based on the closed caption synthesized video signal WV to be displayed on a screen provided in the video output device 300. The sound output device 400 is composed of a speaker, for example. Accordingly, sound based on the sound signal A1 is output from the sound output device 400.

Description will be made of the configuration of the closed caption production device 200. As shown in FIG. 1, the closed caption production device 200 includes a buffer 1, a synchronization signal detector 2, a video/sound recognizer 3, a controller 4, a video/sound classifier 5, a text producer 6, a character synthesizer 7, a video memory 8 and a closed caption synthesizer 9.

In the closed caption production device 200, the video signal V1 and the sound signal Al provided from the video and sound input device 100 are provided to the buffer 1, the synchronization signal detector 2 and the video/sound recognizer 3.

The buffer 1 is composed of a frame memory and so on, and temporarily accumulates the provided video signal V1 and sound signal A1 in frame units. The synchronization signal detector 2 extracts a synchronization signal for each of frames as time information SY from headers included in the video signal V1 and the sound signal A1, and provides the time information SY to the controller 4.

The video/sound recognizer 3 includes a video recognizer 3*a* and a sound recognizer 3*b*. The video recognizer 3*a* performs video recognition processing, described later, based on the provided video signal V1. Thus, video recognition information IF1 is acquired. The sound recognizer 3*b* performs sound recognition processing, described later, based on the provided sound signal A1. Thus, sound recognition information IF2 is acquired. The video recognition information IF1 and the sound recognition information IF2 are provided to the controller 4.

The video recognition information IF1 is information related to the video to be displayed on the screen of the video output device 300 based on the video signal V1, and includes information on a background in the video, a position of a working object, a display area of the working object and so on.

The sound recognition information IF2 is information related to the sound to be output from the sound output device 400 based on the sound signal A1, and includes information on types of sound (Speech, Sound effect, Ambient noise, Noise and so on), an estimated position of a sound source and so on.

When the sound type is Speech, the sound signal A1 is converted into character codes representing the sound in one-character units by the sound recognition processing. A series of character codes is divided into text (or clause) units by the sound recognition processing.

Furthermore, frequency characteristics of the sound in one-character units of the character codes are also acquired at the time of the sound recognition processing. Details of the video recognition information IF1 and the sound recognition information IF2 will be described later.

The controller 4 is composed of a CPU (Central Processing Unit) and a storage device 4R such as a memory, for example. The controller 4 controls the operation of each component of the closed caption production device 200. Note that the storage device 4R may be provided outside of the controller 4.

In the controller 4, the time information SY provided from the synchronization signal detector 2 as well as the video recognition information IF1 and the sound recognition information IF2 provided from the video/sound recognizer 3 are stored in the storage device 4R.

The video/sound classifier 5 includes a video classifier 5*a* and a sound classifier 5*b*. The video classifier 5*a* performs video classification processing based on the video recognition information IF1 stored in the storage device 4R.

In the video classification processing, the video recognition information IF1 is classified for each working object that has been recognized, so that video classification information CT1 is produced. The video classification information CT1 is stored in a video classification table provided in the storage device 4R. Details of the video classification processing will be described later.

The sound classifier 5*b* performs sound classification processing, described later, based on the sound recognition information IF2 stored in the storage device 4R.

In the sound classification processing, the sound recognition information IF2 is classified for each sound source that has been recognized, so that sound classification information CT2 is produced. The sound classification information CT2 is stored in a sound classification table provided in the storage device 4R. Details of the sound classification processing will be described later.

The controller 4 performs linking processing in which the working object and the sound source are associated with each other based on the video classification information CT1 and the sound classification information CT2.

The linking processing is performed by comparing a coordinate value obtained by applying the position of the working object in the video recognized by the video recognition processing to a spatial coordinate system with a coordinate value obtained by applying the estimated position of the sound source recognized by the sound recognition processing to the spatial coordinate system, for example.

When a result of the comparison indicates that the coordinate value of the working object in the video and the estimated coordinate value of the sound source are close to each other, that is, when the result of the comparison indicates not more than a predetermined threshold value, the controller 4 recognizes that the working object and the sound source correspond to each other.

In this manner, the controller 4 associates by the linking processing the working object in the video recognized by the video recognition processing with the sound source recognized by the sound recognition processing. Then, the character codes classified for each sound source are associated with each working object. Details will be described later.

The text producer 6 acquires the character codes from the sound classification table in the storage device 4R, produces a closed caption text signal WC by performing a Japanese syllabary character—Chinese character conversion (Kana-Kanji conversion) to the series of character codes, and provides the closed caption text signal WC to the controller 4.

A text production table that stores information such as the text of the closed caption, a display time period thereof and a display position thereof is provided in the storage device 4R. The controller 4 extracts information for producing the video of the closed caption in frame units from the time information SY, the closed caption text signal WC, the video classification information CT1 and the sound classification information CT2 and stores the information in the text production table. Details will be described later.

The character synthesizer 7 produces the closed caption video signal WS based on the information stored in the text production table, and provides the closed caption video signal WS to the controller 4. The controller 4 stores the provided closed caption video signal WS in the video memory 8.

The video memory 8 includes a frame memory capable of holding the closed caption video signal WS, for example, of two frames (a double buffer structure), and temporarily stores the closed caption video signal WS provided from the controller 4 in frame units.

The closed caption video signal WS in frame units stored in the video memory 8 is transmitted to the buffer 1 through the controller 4. This causes the closed caption video signal WS in addition to the video signal V1 and sound signal A1 in frame units to be accumulated in the buffer 1.

The controller 4 instructs the buffer 1 to output the video signal V1, the sound signal A1 and the closed caption video signal WS based on the time information SY. This causes the video signal V1 and the closed caption video signal WS to be input to the closed caption synthesizer 9.

The closed caption synthesizer 9 produces a closed caption synthesized video signal WV in frame units representing video to which the closed caption is added by superimposing the closed caption video signal WS on the video signal V1. As described above, the produced closed caption synthesized video signal WV is output to the video output device 300. Moreover, the sound signal A1 synchronized with the closed caption synthesized video signal WV is output to the sound output device 400.

(2) Operational Flow of the Closed Caption Production Device

FIG. 2 is a flowchart showing a series of operations performed by the closed caption production device 200 of FIG. 1. First, the closed caption production device 200 acquires the time information SY from the video signal V1 and the sound signal A1 provided from the video and sound input device 100 of FIG. 1 (Step S11).

Next, the closed caption production device 200 accumulates the video signal V1 in frame units (step S21). Also, the closed caption production device 200 accumulates the sound signal A1 in frame units (Step S31). Furthermore, the closed caption production device 200 performs the closed caption production processing for superimposing the closed caption on the video signal V1 based on the sound signal A1 (Step S40). The operations of Steps S21, S31, S40 are concurrently performed.

Details of the operational flow of the closed caption production processing are described as follows. The closed caption production device 200 performs the video recognition processing based on the provided video signal V1 (Step S41), and then performs the video classification processing (Step S42). This causes the above-described video classification information CT1 to be obtained.

The closed caption production device 200 performs the sound recognition processing based on the provided sound signal V2 (Step S51) and subsequently performs the sound classification processing (Step S52) concurrently with the operations of Steps S41, S42. This causes the above-described sound classification information CT2 to be obtained. The operations of Steps S41, S51 and the operations of Steps S42, S52, are concurrently performed, respectively.

Then, the closed caption production device 200 performs the linking processing based on the video classification information CT1 and the sound classification information CT2, and associates the working object in the video with the sound source (Step S43).

Note that the linking processing by the closed caption production device 200 may be performed concurrently with the operations of Steps S41, S42, S51, S52.

For example, the closed caption production device 200 associates the information of the working object included in the video recognition information IF1 with the information of the sound source included in the sound recognition information IF2 by the linking processing.

The closed caption production device 200 subsequently produces the text of the closed caption to be displayed on the screen based on the sound classification information CT2 (Step S44). That is, the closed caption production device 200 converts the series of character codes into Chinese characters and Japanese syllabary characters.

Next, the closed caption production device 200 produces the video of the closed caption (the closed caption video signal WS) to be displayed on the screen in frame units (Step S45), and accumulates the video of the closed caption (Step S46).

The above-described operations of Steps S41 to S46 and Steps S51, S52 constitute the closed caption production processing of Step S40.

Next, the closed caption production device 200 determines an output timing of the accumulated video signal V1, sound signal A1 and closed caption video signal WS based on the synchronization signal of the time information SY obtained from the video signal V1 and the sound signal A1, and outputs each signal at the determined timing (Step S47).

The closed caption production device 200 outputs each signal while synthesizing the video signal V1 and the closed caption video signal WS at the time of the output (Step S61). This causes the above-mentioned closed caption synthesized video signal WV to be produced and output. After the operations of Step S47 and Step S61, the closed caption production device 200 returns to the operation of Step S11.

When the video signal V1 and the sound signal A1 provided to the closed caption production device 200 are digital signals, the time information SY is acquired from the headers included in the respective signals V1, A1, as shown in FIG. 2. This causes the time information SY of each of the video signal V1 and the sound signal A1 to be acquired.

In contrast, when the video signal V1 and the sound signal A1 provided to the closed caption production device 200 are analog signals, the closed caption production device 200 acquires the synchronization signal included in the video signal V1.

Then, the closed caption production device 200 turns on a timer incorporated in the controller 4. Thus, the closed caption production device 200 acquires the time information SY of the sound signal A1 based on the synchronization signal input from the video signal V1 and the time period measured by the timer of the controller 4. The time information SY is used for calculating the timing of the linking processing, the timing of the output of the video signal V1, the sound signal A1 and the closed caption video signal WS and so on.

While the operations of the components in the closed caption production device 200 are shown in the flowchart of FIG. 2, a program shown in the above-described flowchart may be stored in the storage device 4R to cause the CPU of the controller 4 to control the operations of the components based on the program stored in the storage device 4R.

Hereinafter, details of the video recognition processing, the sound recognition processing, the video classification processing and the sound classification processing will be described while showing specific examples.

(3) Example of the Operations of the Closed Caption Production Device

FIG. 3 is a diagram for explaining the sound recognition information IF2 and the sound classification information CT2.

FIG. 3(*a*) shows the screen SC1 of the video output device 300, in which a plurality of persons P1, P2, P3 and a helicopter HC are displayed while speeches S1, S2, S3 are made by the plurality of persons P1, P2, P3, respectively, and a flight noise E1 is generated from the helicopter HC. Description will be made of a case where the video signal V1 and the sound signal A1 of such a program are input to the closed caption production device 200.

In the program of FIG. 3(*a*), the plurality of persons P1, P3, P2 in the order of the reference numerals align from a left end to the center on the screen SC1 while the helicopter HC is positioned at a right end on the screen SC1. The speeches S1, S2, S3 in this order are made by the plurality of persons P1, P2, P3.

The video signal V1 and the sound signal A1 of the program of FIG. 3(*a*) are input to the closed caption production device 200. In this case, the sound recognition processing is performed by the sound recognizer 3*b*, and the sound recognition information IF2 shown in FIG. 3(*b*), for example, is produced.

As shown in FIG. 3(*b*), the sound recognition information IF2 includes the types of sound in this example. In FIG. 3(*b*), “Sound Effect”, “Ambient Noise”, “Speech” and “Noise” are illustrated as the types of sound.

The types of sound are recognized by the sound recognizer 3*b* of FIG. 1 based on the frequency characteristics, the sound volume (amplitude) and so on of the sound obtained from the sound signal A1. In this example, the sound recognizer 3*b* recognizes the sounds made by the persons P1, P2, P3 as speeches, and recognizes the sound generated from the helicopter HC as an ambient noise.

Then, the sound recognizer 3*b* converts the sounds recognized as the speeches into character codes while performing the operation of dividing the series of character codes into respective texts. In addition, the sound recognizer 3*b* acquires the frequency characteristics and so on of the sounds, which have been recognized as the speeches, in one-character units of the character codes. Details will be described later.

Note that the sound recognizer 3*b* may convert sound recognized as a type other than the speech into character codes.

Furthermore, when a stereo broadcast is received by the video and sound input device 100, the sound recognizer 3*b* estimates the position of the sound source based on the stereo sound signal of two channels. For example, the position of the sound source is estimated by comparing amplitudes of the sound signal having the same frequency characteristics in one channel and the other channel.

Accordingly, it is estimated that the sound source of "Ambient Noise: BA RI BA RI . . . " is positioned at the right end of the screen SC1, the sound source of "Speech: KO N NI CHI WA (Hello)" is positioned at the left end of the screen SC1, the sound source of "Speech: WA TA SHI WA PI I TSU U DE SU (I am P2)" is positioned at the center of the screen SC1, and the sound source of "Speech: HA JI ME MA SHI TE (Nice to meet you)" is positioned on a slightly left side of the screen SC1 as shown in FIG. 3(*b*).

In this manner, the sound recognition processing is performed by the sound recognizer 3*b*, so that the sound recognition information IF2 of FIG. 3(*b*) is stored in the storage device 4R. After that, the sound classification processing is performed by the sound classifier 5*b*.

FIG. 3(*c*) shows one example of the sound classification information CT2 produced based on the sound recognition information IF2 of FIG. 3(*b*).

The sound classifier 5*b* recognizes that "Speech: KO N NI CHI WA", "Speech: WA TA SHI WA PI I TSU U DE SU" and "Speech: HA JI ME MA SHI TE" recognized by the sound recognition information IF2 are the sounds made by the different persons based on the frequency characteristics of the sounds obtained from the sound signal A1 or the estimated positional information of the sound sources. Specific examples of the recognition method will be described later.

Then, the sound classifier 5*b* presumptively recognizes the persons corresponding to the foregoing speeches as persons Q1, Q2, Q3, and associates various types of information with these persons.

For example, the sound classifier 5*b* associates the character codes of "Speech: KO N NI CHI WA", the character codes of "Speech: WA TA SHI WA PI I TSU U DE SU" and the character codes of "Speech: HA JI ME MA SHI TE" obtained by the sound recognition processing with the persons Q1, Q2, Q3, while associating the estimated positions of the sound sources corresponding to the respective speeches with the persons Q1, Q2, Q3.

Furthermore, the sound classifier 5*b* sets the display time periods of the closed captions of the speeches for the respective persons Q1, Q2, Q3 based on the time information SY, and classifies the display time periods. In addition, the sound classifier 5*b* sets display colors of the closed captions of the speeches for the respective persons Q1, Q2, Q3, and classifies the display colors.

The sound classification processing is performed in this manner to produce the sound classification information CT2. The sound classification information CT2 is stored in the sound classification table in the storage device 4R.

Here, the linking processing by the controller 4 of FIG. 1 is performed. Description will be made of the linking processing.

In this example, it is recognized by the video recognition processing that the plurality of persons P1, P3, P2 align in this order from the left end to the center on the screen SC1 as shown in FIG. 3(*a*). Thus, the controller 4 compares the positions of the persons P1, P2, P3 on the screen recognized by the video recognition processing with the estimated positions of the presumptive persons Q1, Q2, Q3 stored as the sound classification information CT2.

Accordingly, the controller 4 associates the persons P1, P2, P3 recognized as the working objects in the video with the presumptive persons Q1, Q2, Q3. In this manner, the persons P1, P2, P3 that are the working objects in the video are associated with the sounds of the speeches made by the respective persons by the linking processing.

FIG. 4 is a diagram for explaining the text production table, video based on the closed caption video signal WS, and the closed caption synthesized video.

As described above, the text producer 6 of FIG. 1 performs the Japanese syllabary character—Chinese character conversion to the character codes converted by the sound recognition processing, and produces the closed caption text signal WC. As shown in FIG. 4(*a*), the produced closed caption text signal WC is stored in the text production table in the storage device 4R.

Here, the controller 4 sets the positions (the closed caption positions), in which the closed captions are to be displayed, on the screen. In FIG. 4(*a*), the closed caption positions are indicated by the coordinate values by defining a two-dimensional coordinate system on the screen of the video output device 300.

Note that the controller 4 may perform linking processing of the helicopter HC displayed at the right end of the screen of FIG. 3(*a*) with the sound source of "Ambient noise: BA RI BA RI . . . " of FIG. 3(*b*) at the time of performing the above-described linking processing. In this case, the controller 4 can set the closed caption position of the ambient noise.

FIG. 4(*b*) shows one example of the video based on the closed caption video signal WS. Note that the display time periods of the closed captions are not considered in this example. In FIG. 4(*b*), the closed captions based on the closed caption text signal WC are shown by the character strings C1, C2, C3. These character strings C1, C2, C3 are produced from the speeches S1, S2, S3 of FIG. 3, and associated with the persons P1, P2, P3 of FIG. 3.

Moreover, the closed caption based on the closed caption text signal WC produced from the flight noise E1 of the helicopter HC of FIG. 3 is shown by the character string CX. Note that the character strings C1, C2, C3, CX are displayed with the respective display colors set in the text production table.

The closed caption video signal WS of FIG. 4(*b*) and the video signal V1 are synthesized to produce the closed caption synthesized video signal WV, so that the closed caption synthesized video shown in FIG. 4(*c*) is displayed on the screen SC1 of the video output device 300.

(4) One Example of the Sound Recognition Processing and the Sound Classification Processing Description will be made of one example of the sound recognition processing by the sound recognizer 3*b* of FIG. 1 and the sound classification processing by the sound classifier 5*b* of FIG. 1. FIG. 5 is a diagram showing one example of the sound recognition processing by the sound recognizer 3*b* of FIG. 1 and the sound classification processing by the sound classifier 5*b* of FIG. 1.

In the following description, it is assumed that the sound signal A1 including the speeches S1, S2, S3 of the persons P1, P2, P3 described in FIGS. 3 and 4 is provided to the sound recognizer 3*b*.

The sound recognizer 3*b* is provided with the sound signal A1 to perform the following processing, for example, as the sound recognition processing.

As shown in FIG. 5(*a*), the sound recognizer 3*b* converts the provided sound signal A1 into the character codes.

Here, the sound recognizer 3*b* further acquires the frequency characteristics of the sound in one-character units of the character codes. Then, the sound recognizer 3*b* recognizes the type of the sound converted into the series of character codes based on the acquired frequency characteristics. In this example, the type of the sound converted into the series of character codes "HA•JI•ME•MA•SHI•TE•WA•TA . . . (Nice to meet you, I am P2)" is recognized as "Speech".

As described above, the character codes, the frequency characteristics and the type of the sound obtained by the sound recognition processing of the sound recognizer 3*b* are stored in the storage device 4R of FIG. 1 as the sound recognition information IF2.

The sound classifier 5*b* performs the following processing, for example, as the sound classification processing based on the sound recognition information IF2 stored in the storage device 4R.

First, the sound classifier 5*b* recognizes the texts from the series of character codes, and separates the character codes for each text. The texts are recognized by a Japanese language input program or the like using a generally-used method.

FIG. 5(*b*) shows one example of the sound classification processing by the sound classifier 5*b*. As shown in FIG. 5(*b*), the sound classifier 5*b* separates the character codes "HA JI ME MA SHI TE (Nice to meet you)" representing the initial text and the character codes "WA TA SHI WA PI I TSU U DE SU (I am P2)" representing the next text.

In this manner, the sound classifier 5*b* separates the character codes for each text, and determines whether or not there exists the same character in the character codes of the separated texts.

In the example of FIG. 5(*b*), the character "SHI" is used in common in the character codes of the initial text and the character codes of the next text.

Here, the sound classifier 5*b* extracts the frequency characteristics (voice print) corresponding to the character "SHI" of the initial text and the frequency characteristics corresponding to the character "SHI" of the next text from the sound recognition information IF2 stored in the storage device 4R.

Note that when characters having a common vowel exist in the character codes of the initial text and the character codes of the next text, the sound classifier 5*b* may extract the frequency characteristics corresponding to those characters even though the same character does not exist in the character codes of the texts.

Then, the sound classifier 5*b* contrasts the frequency characteristics extracted from the character of the initial text as a reference with the frequency characteristics extracted from the character of the next text.

The contrast of the frequency characteristics is performed by means of contrast of frequency distributions, contrast of center frequencies or the like, for example. The sound classifier 5*b* defines a parameter indicating a degree of coincidence between frequency characteristics as a reference (hereinafter referred to as reference frequency characteristics) and frequency characteristics to be subjected to the contrast (hereinafter referred to as contrast frequency characteristics) as a coincidence rate.

Then, the sound classifier 5*b* further sets a threshold value for the coincidence rate. For example, the threshold value is set to 70% under the condition that the coincidence rate when the reference frequency characteristics and the contrast frequency characteristics completely coincide with each other is 100% and the coincidence rate when the reference frequency characteristics and the contrast frequency characteristics can be assumed to substantially coincide with each other is 70%.

In this case, the sound classifier 5*b* determines that the character code of the initial text and the character code of the next text are acquired from speeches made by the same person when the coincidence rate between the reference frequency characteristics and the contrast frequency characteristics is not less than 70%.

Moreover, the sound classifier 5*b* determines that the character code of the initial text and the character code of the next text are acquired from speeches of different persons when the coincidence rate is lower than 70%.

In the example of FIG. 5(*b*), the comparison of the reference frequency characteristics with the contrast frequency characteristics results in the coincidence rate of 40%. In this case, the sound classifier 5*b* determines that the character code of the initial text and the character code of the next text are acquired from the speeches of the different persons.

As shown in the example of FIG. 5(*b*), when it is determined that the initial text and the next text are made by the different persons, the sound classifier 5*b* stores the character codes of the initial text and the frequency characteristics thereof in the sound classification table as first character codes and first frequency characteristics belonging to a first person, for example, and stores the character codes of the next text and the frequency characteristics thereof in the sound classification table as second character codes and second frequency characteristics belonging to a second person, for example.

When there further exists a next text, the sound classifier 5*b* compares character codes of the text and frequency characteristics thereof with the first character codes and the first frequency characteristics, and then with the second character codes and the second frequency characteristics.

The sound classifier 5*b* determines that the text is acquired from a speech made by another person, thus storing the character codes of the text and the frequency characteristics thereof in the sound classification table as third character codes and third frequency characteristics belonging to a third person, for example.

In this manner, the sound classifier 5*b* stores in the sound classification table the character codes of the texts and the frequency characteristics thereof as well as the persons making the texts, and recognizes the persons making the speeches based on the stored character codes and frequency characteristics thereof.

(5) One Example of the Sound Recognition Processing and the Sound Classification Processing Performed When a Plurality of Persons Make Speeches FIGS. 6 to 11 are diagrams for explaining one example of the sound recognition processing and the sound classification processing performed in the closed caption production device 200 of FIG. 1 when a plurality of persons make speeches. Note that it is assumed that the threshold value of the coincidence rate used at the time of recognizing the persons making the speeches is set to 70% in the following description.

The screen SC1 of the video output device 300 (FIG. 1) in which a person A is displayed and a speech made by the person A are shown in FIG. 6(*a*). As described above, the video signal V1 and the sound signal A1 are provided, so that the sound recognizer 3*b* of the closed caption production device 200 converts the sound signal A1 into character codes, and acquires frequency characteristics of the sound for each character of the character codes.

Then, the sound classifier 5*b* stores the character codes "BI I SA N SHI I SA N . . . (Here come Mr. B and Mr. C)" representing initial text and the frequency characteristics thereof for each character in the sound classification table as the speech made by the person A.

Then, video of the person A obtained by the video signal V1 and the person A stored in the sound classification table are linked by the controller 4. As a result, the closed caption of the speech made by the person A is displayed in the vicinity of the video of the person A on the screen SC1 of the video output device 300 as shown in FIG. 6(*b*).

Note that the linking processing may be performed by the sound classifier 5*b*. In this case, the position or the closed caption position of the person A on the screen is stored in the sound classification table.

Next, the screen SC1 of the video output device 300 when a person B in addition to the person A appears and a speech made by the person A are shown in FIG. 7(*c*). In this case, character codes of text belonging to the person A and frequency characteristics thereof are acquired by the sound recognizer 3*b*.

Then, the sound classifier 5*b* contrasts the character codes "BI I SA N SHI I SA N . . . " of the text stored in the sound classification table as the speech of the person A and the frequency characteristics thereof as the reference with the character codes "BI I SA N KO N NI CHI WA (Hello, Mr. B)" of the newly acquired text and the frequency characteristics thereof for each character.

In this example, the sound classifier 5*b* compares the frequency characteristics of the character "BI" used in common in the initial text and the new text. The frequency characteristics acquired from the initial text as the reference frequency characteristics are compared with the frequency characteristics acquired from the new text as the contrast frequency characteristics.

As a result, when the coincidence rate of the same one character is 80%, which is larger than the threshold value (70%), the sound classifier 5*b* determines that the character codes "BI I SA N KO N NI CHI WA" of the newly acquired text and the frequency characteristics thereof are acquired from the speech of the person A. That is, the sound classifier 5*b* determines that the new speech is made by the person A.

In this case, the closed caption of the new speech made by the person A is displayed in the vicinity of the video of the person A on the screen SC1 of the video output device 300 as shown in FIG. 7(*d*).

The screen SC1 of the video output device 300 in which the person A and the person B are displayed and a speech made by the person B are shown in FIG. 8(*e*). In this case, the sound recognizer 3*b* acquires character codes of text belonging to the person B and frequency characteristics thereof.

Then, the sound classifier 5*b* contrasts the character codes "BI I SA N SHI I SA N . . . " of the text stored in the sound classification table as the speech of the person A and the frequency characteristics thereof as the reference with the character codes "BI I DE SU (I am B)" of the newly acquired text and the frequency characteristics thereof for each character.

When the coincidence rate of the same one character is 30%, which is smaller than the threshold value (70%), the sound classifier 5*b* determines that the character codes "BI I DE SU" of the newly acquired text and the frequency characteristics thereof are acquired from the speech of the person different from the person A. That is, the sound classifier 5*b* determines that the new speech is not made by the person A.

In this case, the sound classifier 5*b* stores the character codes "BI I DE SU" of the newly acquired text and the frequency characteristics thereof in the sound classification table as the speech made by the person B as shown in FIG. 8(*f*).

This causes the character codes and the frequency characteristics thereof based on the sounds made by the person A and the person B to be stored in the sound classification table.

Then, the video of the person B obtained by the video signal V1 and the person B stored in the sound classification table are linked with each other by the controller 4. As a result, the closed caption of the speech made by the person B is displayed in the vicinity of the video of the person B on the screen SC1 of the video output device 300 as shown in FIG. 8(*g*).

In this case also, the linking processing may be performed by the sound classifier 5*b*. In this case, the position or the closed caption position of the person B on the screen is stored in the sound classification table.

The screen SC1 of the video output device 300 on which the person A and the person B are displayed and a speech made by a person C not displayed on the screen SC1 are shown in FIG. 9(*h*). In this case, character codes of text belonging to the person C and frequency characteristics thereof are acquired by the sound recognizer 3*b*.

Then, the sound classifier 5*b* contrasts the character codes "BI I SA N SHI I SA N . . . " stored in the sound classification table as the speech of the person A and the frequency characteristics thereof as the reference with the newly acquired character codes "BI I SA N MA TSU. (Wait, Mr. B)" and the frequency characteristics thereof for each character.

When the coincidence rate of the same one character is 50%, which is smaller than the threshold value (70%), the sound classifier 5*b* determines that the character codes "BI I SA N MA TSU . . . " of the newly acquired text and the frequency characteristics thereof are acquired from the speech of the person different from the person A. That is, the sound classifier 5*b* determines that the new speech is not made by the person A.

Moreover, the sound classifier 5*b* contrasts the character codes "BI I DE SU" stored in the sound classification table as the speech of the person B and the frequency characteristics thereof as the reference with the newly acquired character codes "BI I SA N MA TSU . . . " and the frequency characteristics thereof for each character.

When the coincidence rate of the same one character is 20%, which is smaller than the threshold value (70%), the sound classifier 5*b* determines that the character codes "BI I SA N MA TSU . . . " of the newly acquired text and the frequency characteristics thereof are acquired from the speech of the person different from the person B. That is, the sound classifier 5*b* determines that the new speech is not made by the person B.

In this case, the sound classifier 5*b* stores the character codes "BI I SA N MA TSU . . . " of the newly acquired text and the frequency characteristics thereof in the sound classification table as the speech made by the person C as shown in FIG. 9(*i*).

This causes the character codes based on the speeches made by the person A, the person B and the person C and the frequency characteristics thereof to be stored in the sound classification table.

Then, the linking processing is performed. In this example, the person C stored in the sound classification table does not exist on the screen. In this case, the text producer 6 determines that a sound source of the character codes stored in the sound classification table does not exist on the screen. Then, the text producer 6 decides a closed caption position in a predetermined region (standard position) on the screen.

Figure 10:
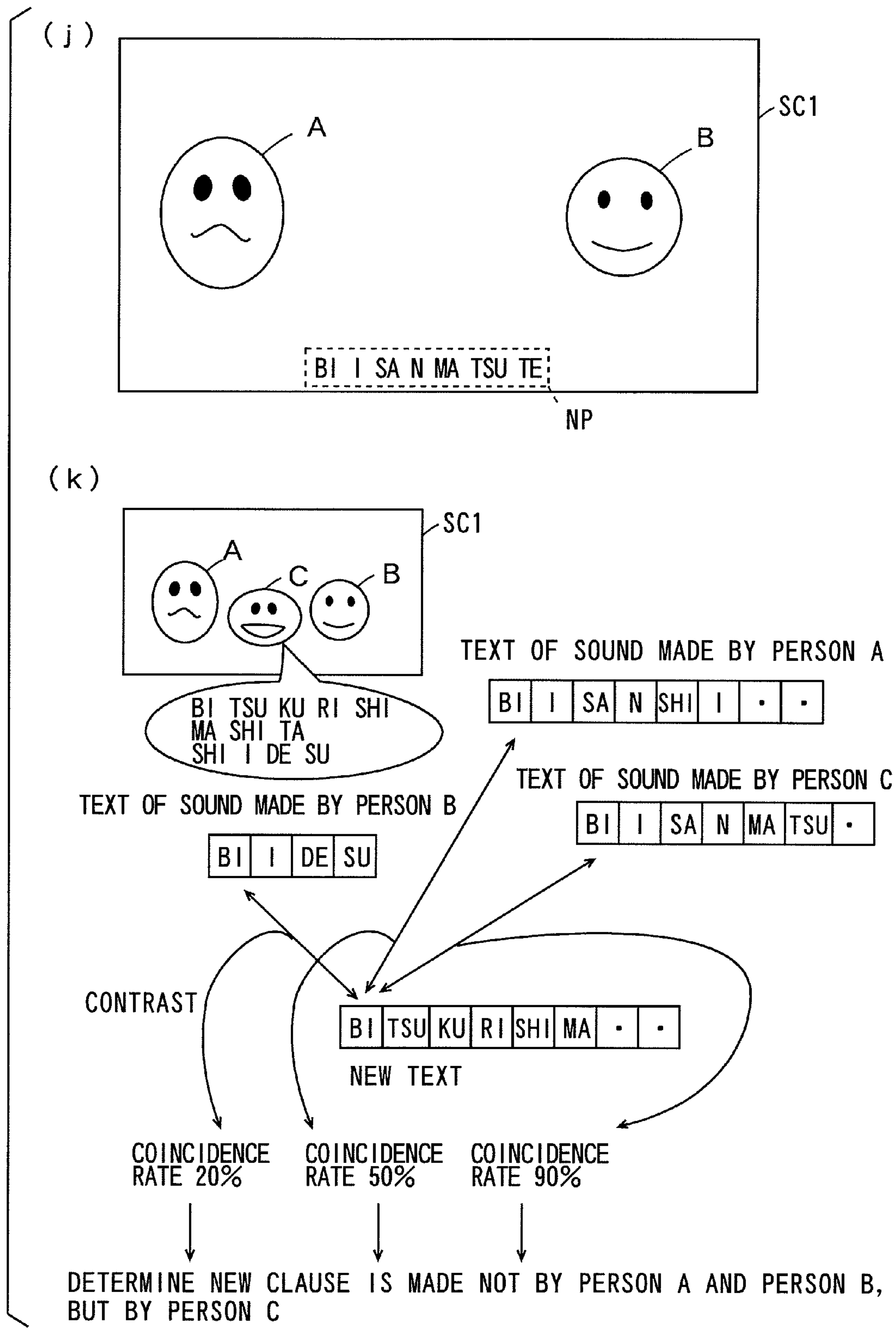
FIG. 10 is a diagram for explaining the one example of the sound recognition processing and the sound classification processing performed in the closed caption production device of FIG. 1 when the plurality of persons make the speeches.

Accordingly, the closed caption of the speech made by the person C not existing on the screen is displayed at the standard position NP on the screen as shown in FIG. 10(*j*). When the sound classifier 5*b* performs the linking processing, the sound classifier 5*b* decides the closed caption position at the standard position NP.

The screen SC1 of the video output device 300 when the person C in addition to the person A and the person B appears and a speech made by the person C are shown in FIG. 10(*k*).

In this case, character codes of text belonging to the person C and frequency characteristics thereof are acquired by the sound recognizer 3*b*.

Then, the sound classifier 5*b* contrasts the character codes "BI I SA N SHI I SA N . . . " of the text stored in the sound classification table as the speech of the person A and the frequency characteristics thereof as the reference with the character codes "BI TSU KU RI SHI MA . . . (I am surprised, I am C)" of the newly acquired text and the frequency characteristics thereof for each character.

When the coincidence rate of the same one character is 50%, which is smaller than the threshold value (70%), the sound classifier 5*b* determines that the character codes "BI TSU KU RI SHI MA . . . " of the newly acquired text and the frequency characteristics thereof are acquired from the speech of the person different from the person A. That is, the sound classifier 5*b* determines that the new speech is not made by the person A.

In addition, the sound classifier 5*b* contrasts the character codes "BI I DE SU" of the text stored in the sound classification table as the speech of the person B and the frequency characteristics thereof as the reference with the character codes "BI TSU KU RI SHI MA . . . " of the newly acquired text and the frequency characteristics thereof for each character.

When the coincidence rate of the same one character is 20%, which is smaller than the threshold value (70%), the sound classifier 5*b* determines that the character codes "BI TSU KU RI SHI MA . . . " of the newly acquired text and the frequency characteristics thereof are acquired from the speech of the person different from the person B. That is, the sound classifier 5*b* determines that the new speech is not made by the person B.

Furthermore, the sound classifier 5*b* contrasts the character codes "BI I SA N MA TSU . . . " of the text stored in the sound classification table as the speech of the person C and the frequency characteristics thereof as the reference with the character codes "BI TSU KU RI SHI MA . . . " of the newly acquired text and the frequency characteristics thereof for each character.

When the coincidence rate of the same one character is 90%, which is larger than the threshold value (70%), the sound classifier 5*b* determines that the character codes "BI TSU KU RI SHI MA . . . " of the newly acquired text and the frequency characteristics thereof are acquired from the speech of the person C. That is, the sound classifier 5*b* determines that the new speech is made by the person C.

As a result, the closed caption of the new speech made by the person C is displayed in the vicinity of video of the person C on the screen SC1 of the video output device 300 as shown in FIG. 11(*l*).

Note that the sound classifier 5*b* may store character codes of a plurality of texts and frequency characteristics thereof for each person in the storage device 4R. In this manner, the character codes and the frequency characteristics thereof stored for each person are accumulated, so that erroneous recognition of the persons being the sound sources is gradually reduced in accordance with the accumulation.

(6) Another Example of the Sound Recognition Processing and the Sound Classification Processing The sound output device 400 including three or more speakers for outputting sound with realistic sensation has been developed. The sound output device 400 is provided with the sound signal A1 capable of causing independent sounds to be output from respective speakers, for example. In the following description, the sound signal A1 of three channels or more is collectively referred to as a surround sound signal.

FIG. 12 is a diagram for explaining one example of a method of recording sound for producing the surround sound signal. As shown in FIG. 12, a plurality of microphones M1 to M5 are arranged so as to be distributed in a recording location of a program, for example, when the program is recorded.

Here, three directions perpendicular to one another in the recording location of the program are defined as an X-direction, a Y-direction and a Z-direction as indicated by the three arrows at an upper left portion of FIG. 12.

The microphones M1 to M5 are arranged so as to be distributed, thus causing sounds (sound volumes and so on, for example) recorded by the respective microphones M1 to M5 to be different from one another.

FIG. 12 shows a picture in which persons A, C, B sequentially align from one side (a left side on the paper) in the X-direction while the person A utters "KE N DO U DE SU (This is Japanese fencing)" as a speech S1, the person B utters "I KI MA SU NE (I am going)" as a speech S2, and the person C utters "SA A KO I (Come on)" as a speech S3. It is assumed that the sound volumes of the utterances by the respective persons are the same.

In FIG. 12, the person A is positioned in the vicinity of the microphone M4. In this case, the microphone 4 acquires the speech S1 of the person A at a high sound volume. Meanwhile, the person C is positioned more apart from the microphone M4 than the person A. In this case, the microphone 4 acquires the speech S3 of the person C at a lower sound volume than that of the speech S1 of the person A.

Moreover, the person B is positioned more apart from the microphone M4 than the person A and the person C. In this case, the microphone M4 acquires the speech S2 of the person B at a lower sound volume than those of the speech S1 and the speech S3 of the person A and the person C.

In contrast, the microphone M5 positioned in the vicinity of the person B acquires the speech S2 of the person B at a high sound volume, acquires the speech S3 of the person C at a lower sound volume than that of the speech S2 of the person B, and acquires the speech S1 of the person A at a lower sound volume than those of the speech S2 and the speech S3 of the person B and the person C.

The surround sound signal recorded in such a manner is input to the closed caption production device 200. At this time, the sound recognizer 3*b* of FIG. 1 acquires from the surround sound signal differences of the sounds from the individual sound sources acquired by the plurality of microphones M1 to M5, for example. Accordingly, the sound recognizer 3*b* can accurately estimate positions of the sound sources based on the differences of the sounds.

This allows the estimated positions of the sound sources to be applied to a three-dimensional coordinate system composed of the X-direction, the Y-direction and the Z-direction to store the coordinate values obtained by the application in the sound classification table as the sound classification information CT2.

As a result, positional accuracy of the sound sources estimated by the sound recognition processing is improved and the positions of the sound sources can be accurately acquired, so that the linking processing by the controller 4 or the sound classifier 5*b* of FIG. 1 is more accurately performed.

Figure 13:
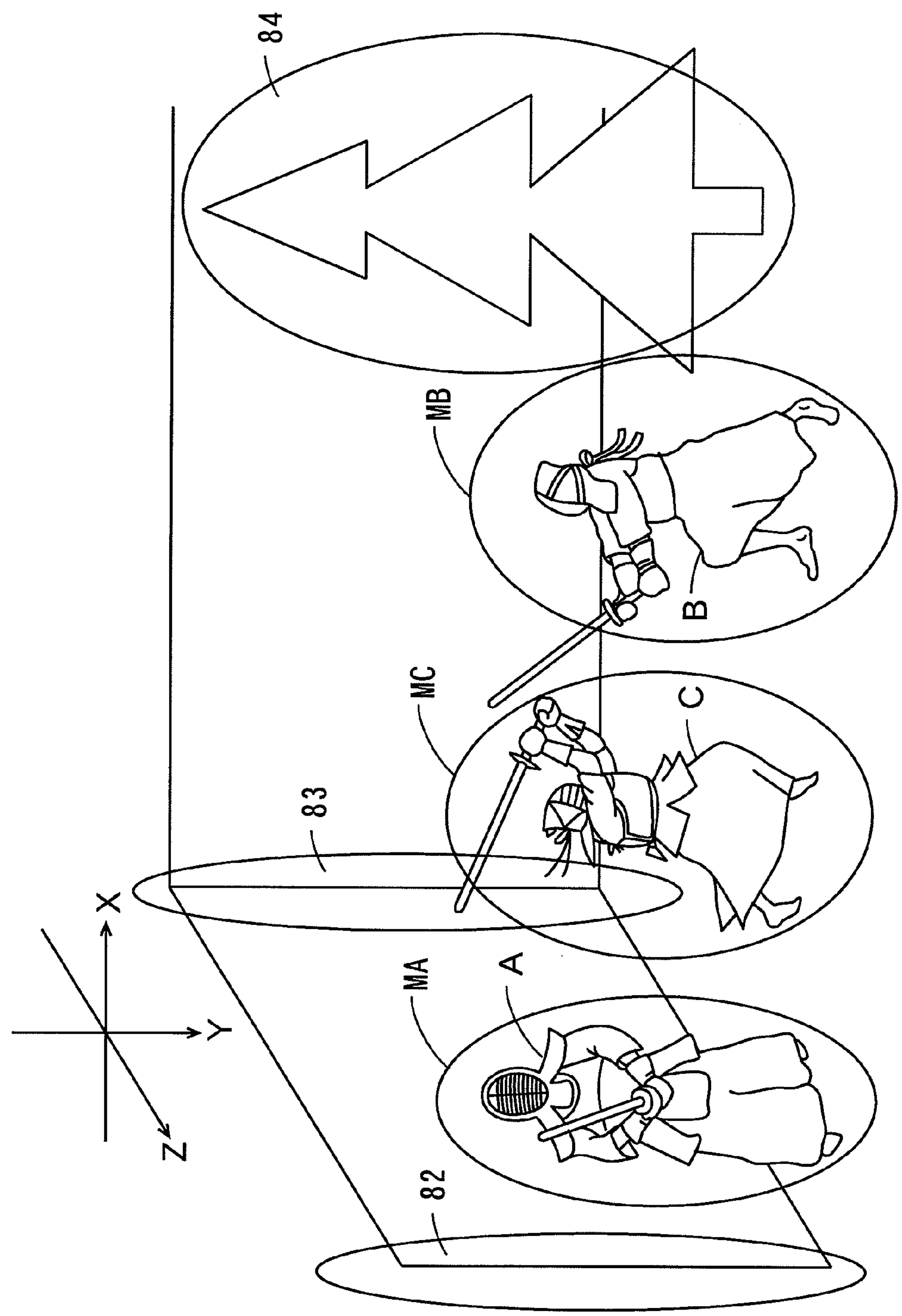
FIG. 13 is a diagram for explaining one example of video recognition processing and video classification processing.

(7) One Example of the Video Recognition Processing and the Video Classification Processing Description will be made of one example of the video recognition processing and the video classification processing. FIG. 13 a diagram for explaining one example of the video recognition processing and the video classification processing.

A recording location shown in FIG. 13 is shot by a video camera. In this case, the video signal V1 (FIG. 1) acquired by the shooting is provided to the video recognizer 3a (FIG. 1). The video recognizer 3a recognizes the working objects and the background based on the video signal V1.

Note that recognition of the working objects can be determined by moving speeds of the objects and so on.

In the recording location of FIG. 13, only the persons A, B, C are moving. In this case, the video recognizer 3a recognizes that the persons A, B, C are the working objects, and stores a result of the recognition in the storage device 4R of FIG. 1 as the video recognition information IF1.

Moreover, the video recognizer 3a recognizes that the outlines of walls 82, 83 and a tree 84 are resting objects, and stores a result of the recognition in the storage device 4R as the video recognition information IF1.

In this manner, the video classifier 5a recognizes display regions MA, MB, MC on the screen of the persons A, B, C being the working objects, thereby allowing the display areas thereof and the positions of the working objects and the resting objects in the recording location to be estimated.

Also in this example, the three directions perpendicular to one another are defined as the X-direction, the Y-direction and the Z-direction as indicated by the three arrows of FIG. 13, similarly to the example of FIG. 12.

Thus, the video classifier 5a can apply the positions of the working objects to the three-dimensional coordinate system composed of the X-direction, the Y-direction and the Z-direction to store the coordinate values obtained by the application in the video classification table as the video classification information CT1.

As a result, the positions of the working objects can be accurately acquired, so that the linking processing by the controller 4 of FIG. 1 is more accurately performed. In addition, when the positions of the sound sources are accurately estimated in the spatial coordinate system by the sound recognition processing and the sound classification processing as shown in FIG. 12, the linking processing by the controller 4 is further easily and accurately performed.

(8) Example of Setting of the Closed Caption Positions

The controller 4 of FIG. 1 sets the closed caption positions as follows, for example. FIG. 14 is a diagram for explaining an example of setting of the closed caption positions by the text producer of FIG. 1.

FIG. 14(*a*) shows the person B and the person C as the working objects in the video. Here, it is assumed that the display region MB of the person B moves at a speed indicated by an arrow BB, and the display region MC of the person C moves at a speed indicated by an arrow CB.

At this time, the video recognizer 3a (FIG. 1) recognizes the display regions MB, MC of the persons B, C in one frame while calculating respective positions of the centers of gravity of the display regions MB, MC. In addition, the video recognizer 3a recognizes the display regions MB, MC of the persons B, C in a next frame while calculating the respective positions of the centers of gravity of the display regions MB, MC.

Accordingly, the video recognizer 3a calculates moving distances of the person B and the person C between the frames. Moreover, the video recognizer 3a calculates speeds (magnitudes and directions of the speeds) of the positions of the centers of gravity of the persons B, C based on the calculated moving distances.

Then, the video recognizer 3a provides the moving distances and the speeds of the persons B, C to the controller 4 as the video recognition information IF1. The information is stored in the storage device 4R of the controller 4.

Here, FIG. 14(*b*) shows video of a frame after one second of the frame of FIG. 14(*a*).

When the persons B, C make speeches while moving, the controller 4 calculates the display regions of the persons B, C of the following frame based on the speeds of the persons B, C and decides the coordinates of the closed caption positions.

Alternatively, the controller 4 may predict reach positions of the persons B, C after an elapse of a predetermined period of time based on the speeds of the persons B, C, and determine the coordinates of the closed caption positions in the vicinity of the predicted reach positions.

Specifically, when it is predicted that the persons B, C being the working objects overlap each other, the controller 4 adjusts the closed caption positions of the speeches S2, S3 at the time of setting the closed caption positions such that the closed caption positions of "Speech S2: I KI MA SU NE" and "Speech S3: SA A KO I" of the persons B, C do not overlap each other.

In this manner, the controller 4 adjusts the closed caption positions of the persons B, C, so that users can accurately recognize correspondences between the sound sources and the character strings displayed as the closed captions.

Moreover, the display colors of the closed captions of the speeches are set for the persons B, C, respectively, in the sound classifier 5b, as described above. In the example of Fig. 14(*b*), the character string 2C based on the speech S2 of the person B and the character string 3C based on the speech S3 of the person C are displayed with yellow and blue, respectively.

The display colors of the closed captions are set for the persons B, C, respectively, so that the users can further accurately recognize the correspondences between the sound sources and the character strings displayed as the closed captions.

In addition, when the plurality of working objects exist in the video and the speeches are made by the respective working objects, for example, the closed caption position of each working object is preferably set such that a distance between the position of the center of gravity of video of each working object and the position of the center of gravity of the closed caption of the sound of the working object is shorter than a distance between the position of the center of gravity of the video of the working object and the position of the center of gravity of the closed caption of another working object. In this case, the correspondences between the video of the plurality of working objects and the closed captions of the sounds generated by the plurality of working objects can be easily and reliably recognized.

Note that the closed caption position of each working object may be set based on the shortest distance between the display region (outline) of the video of each working object and the display region (outline) of the closed caption of the sound of the working object instead of being set based on the distance between the position of the center of gravity of the video of each working object and the position of the center of gravity of the closed caption of the sound of the working object.

In this case, the closed caption position of each working object is set such that the shortest distance between the display region of the video of each working object and the display region of the closed caption of the sound of the working object is shorter than the shortest distance between the display region of the video of the working object and the display region of the closed caption of another working object, for example.

(9) Specific Example of Producing the Tables

FIG. 15 is a diagram showing an example of producing the sound classification table, the video classification table and the text production table by the closed caption production device 200.

FIG. 15(*a*) shows one example of the sound classification table. In the sound classification table, each of the character codes, the output time period of the sound, the display color of the closed caption and the estimated position of the sound source is classified under the persons A, B, C.

Meanwhile, FIG. 15(*b*) shows one example of the video classification table. In the video classification table, each of the area of the display region, the position of the center of gravity of the display region and the speed is classified under the persons A, B, C.

As described above, the positions of the sound sources stored in the sound classification table and the positions of the centers of gravity of the display regions of the persons A, B, C stored in the video classification table are compared with one another in the linking processing by the controller 4.

This causes the persons A, B, C recognized in the sound recognition processing and the persons A, B, C recognized as the working objects by the video recognition processing to be associated with one another.

In this manner, the persons A, B, C of the sound classification table and the persons A, B, C of the video classification table are associated with one another by the controller 4 of FIG. 1, so that the text producer 6 produces the text production table.

Specifically, the text producer 6 performs the Japanese syllabary character—Chinese character conversion to the character codes, thereby producing the texts of the closed captions.

Then, the text producer 6 stores the text of the closed caption, the display time period thereof and the display color of the closed caption for the person A in the text production table as shown in FIG. 15(*c*). In addition, the text producer 6 stores the closed caption position of the person A set by the controller 4 in the text production table. The text producer 6 performs the same operations for the other persons B, C.

(10) Example of Producing the Closed Caption Video Signal

Figure 16:
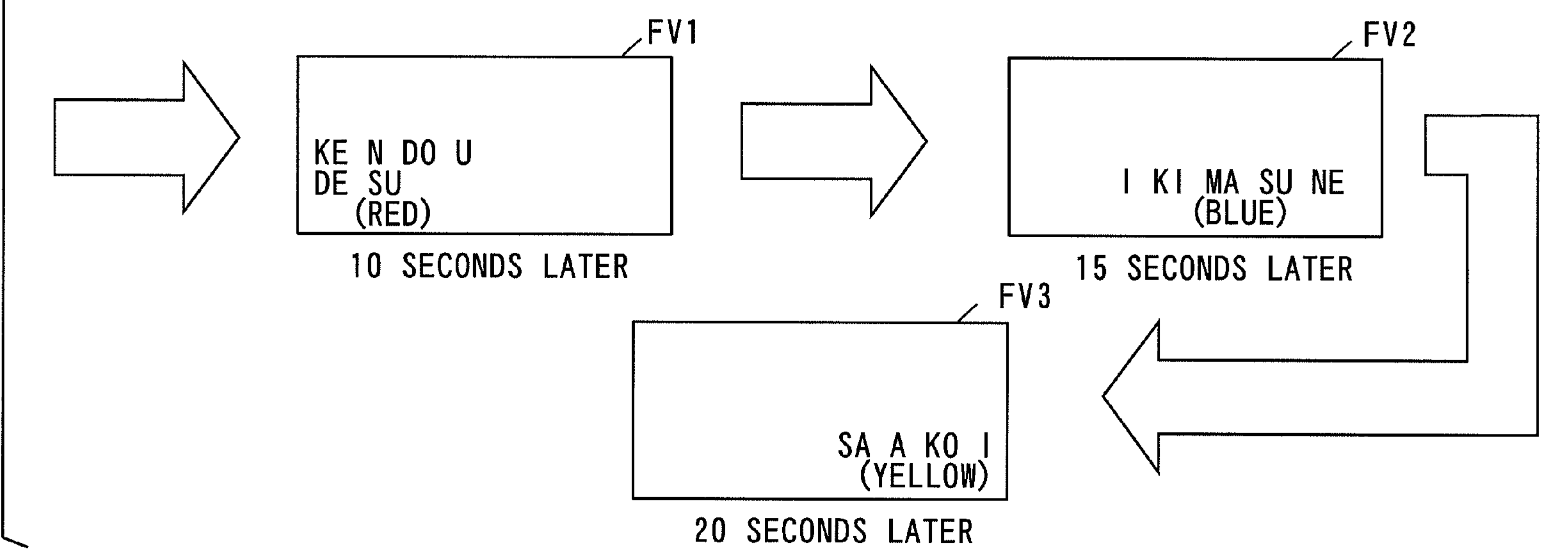
FIG. 16 is a diagram showing an example of producing the closed caption video signal by a character synthesizer of FIG. 1.

FIG. 16 is a diagram showing an example of producing the closed caption video signal WS by the character synthesizer 7 of FIG. 1. FIG. 16(*a*) shows an example of the text production table. The character synthesizer 7 of FIG. 1 extracts the time information SY from the text production table produced by the text producer 6.

In the text production table of FIG. 16(*a*), the time information SY of 10 seconds is classified in the sound of the person A. This causes the character synthesizer 7 to produce the closed caption video signal WS representing the speech of the person A such that the speech of the person A is displayed on the screen SC1 (FIG. 3) of the video output device 300 when 10 seconds have elapsed since the program was started, for example.

Similarly, the character synthesizer 7 produces the closed caption video signal WS representing the speech of the person B based on each information stored in the text production table such that the speech of the person B is displayed on the screen SC1 of the video output device 300 when 15 seconds have elapsed since the program was started.

Moreover, the character synthesizer 7 produces the closed caption video signal WS representing the speech of the person C based on each information stored in the text production table such that the speech of the person C is displayed on the screen SC1 of the video output device 300 when 20 seconds have elapsed since the program was started.

FIG. 16(*b*) shows how the video based on the closed caption video signal WS produced from the text production table of FIG. 16(*a*) changes with time.

The closed caption video signal WS produced from the text production table of FIG. 16(*a*) allows the users to obtain video FV1 of a frame in which the character string "KE N DO U DE SU" is displayed with red at a left end of the screen after 10 seconds of the start of the program.

Moreover, the users can obtain video FV2 of a frame in which the character string "I KI MA SU NE" is displayed with blue at the center of the screen after 15 seconds of the start of the program. Furthermore, the users can obtain video FV3 of a frame in which the character string "SA A KO I" is displayed with yellow at the right of the screen after 20 seconds of the start of the program.

(11) Example of Accumulation and Output of the Signals in the Buffer

FIG. 17 is a conceptual diagram showing how the video signal V1, the sound signal A1 and the closed caption video signal WS of FIG. 1 are accumulated in the buffer 1 of FIG. 1.

As shown in FIG. 17, the buffer 1 is provided with a video storage region RV, a sound storage region RA and a closed caption storage region RS.

As described above, the controller 4 stores in the buffer 1 the video signal V1 and the sound signal A1 input from the video and sound input device 100 to the closed caption production device 200 in frame units.

FIG. 17 shows how videos VV1, VV2, VV3 to VVN of respective frames of the video signal V1 are accumulated in the video storage region RV of the buffer 1 (writing of video).

In addition, FIG. 17 shows how sounds AA1, AA2, AA3 to AAN of respective frames of the sound signal A1 are accumulated in the sound storage region RA of the buffer 1 (writing of sound).

Here, the closed caption video signal WS produced based on the video signal V1 and the sound signal A1 is stored in the video memory 8 of FIG. 1 in the closed caption production device 200, as described above. The controller 4 accumulates in the buffer 1 the closed caption video signal WS in frame units stored in the video memory 8.

FIG. 17 shows how closed caption videos SS1, SS2, SS3 to SSN of respective frames of the closed caption video signal WS are accumulated in the closed caption storage region RS of the buffer 1 (writing of closed caption video).

Here, the controller 4 causes the video VV1 to VVN, the sounds AA1 to AAN and the closed caption video SS1 to SSN of respective frames stored in the buffer 1 to be synchronized with one another based on the time information SY obtained from the synchronization signal detector 2.

The buffer 1 sequentially outputs the video signal V1 (the videos VV1 to VVN), the sound signal A1 (the sounds AA1 to AAN) and the closed caption video signal WS (the closed caption videos SS1 to SSN) that are synchronized with one another in response to a reproduction signal PB instructing each signal to be output from the controller 4. In other words, the video signal V1 (the videos VV1 to VVN), the sound signal A1 (the sounds AA1 to AAN) and the closed caption video signal WS (the closed caption videos SS1 to SSN) stored in the buffer 1 are sequentially read by the controller 4.

(12) Example of Producing the Closed Caption Synthesized Video Signal by the Closed Caption Synthesizer As described above, the video signal V1 and the closed caption video signal WS in frame units are input from the buffer 1 to the closed caption synthesizer 9. The closed caption synthesizer 9 superimposes the closed caption video signal WS on the video signal V1 to produce the closed caption synthesized video signal WV in frame units.

FIG. 18 is a diagram showing an example of producing the closed caption synthesized video signal WV by the closed caption synthesizer 9 of FIG. 1.

FIG. 18(*a*) shows the videos and the speeches S1 to S3 of respective frames based on the video signal V1 and the sound signal A1 output from the buffer 1.

As shown in FIG. 18(*a*), in the buffer 1, the video signal V1 and the sound signal A1 are output after an elapse of a predetermined period of time (a buffer period BF) since a time IN at which the video signal V1 and the sound signal A1 are input.

In this case, the person A appears on the screen while making the speech S1 X second from the time IN after the elapse of the buffer period BF in the example of FIG. 18(*a*). After an elapse of 5 seconds, the person B appears on the screen while making the speech S2. After an elapse of another five seconds, the person C appears on the screen while making the speech S3.

FIG. 18(*b*) shows videos of the frames of the video signal V1 output from the buffer 1, and FIG. 18(*c*) shows videos of the frames of the closed caption video signal WS output from the buffer 1.

As described above, the controller 4 controls the output of each signal from the buffer 1. The controller 4 establishes synchronization among the signals in the buffer 1 based on the time information SY while controlling the output of the signals.

As a result, the accurately synchronized video signal V1 and closed caption video signal WS are synthesized, so that the closed caption synthesized video signal WV is produced in the closed caption synthesizer 9 as shown in FIG. 18(*d*).

(13) Setting of Processing According to Programs

While the respective specific examples of the sound recognition processing, the sound classification processing, the video recognition processing and the video classification processing are described in the foregoing, the controller 4 may adjust setting of each processing for each program viewed by the users.

When the video and sound input device 100 receives a program of a digital broadcast, the closed caption production device 200 is provided with EPG (Electronic Program Guide) data. The EPG also includes information related to genres of programs.

FIG. 19 is a diagram showing one example of the EPG data. As shown in FIG. 19, a name and a genre for each program can be recognized according to the EPG data.

Therefore, the EPG data is provided to the closed caption production device 200, so that the controller 4 recognizes the genre of the program that is currently viewed based on the EPG data, and adjusts the settings of the sound recognition processing, the sound classification processing, the video recognition processing and the video classification processing according to the genre of the program, for example.

Description will be made of specific examples. When the genre of the program viewed by the users is a news program, for example, a stereo sound signal is generally used for the sound signal A1 while a surround sound signal is not used.

In this case, the controller 4 controls the sound recognizer 3*b*, thereby estimating the sound sources by the stereo sound signal.

While specific positions can be estimated in the estimation of the sound sources based on the surround sound signal, approximate locations of characters may be estimated based on the stereo sound signal in a program such as a news program in which characters are not many and motions thereof are small.

In addition, the magnitude of the speed of the object working between frames exceeds a predetermined value (a speed threshold value), so that the working object is recognized in the video recognition processing as described above. Thus, the speed threshold value is set small in a program such as a news program, for example, in which motions of characters are very small. This causes recognition of each person in video to be accurately performed even in the program in which the motions of the characters are very small.

Meanwhile, there can be little movements such as movements of spectators over whole video in a program such as a broadcast of sporting events. In this case, the speed threshold value is set large. This reduces erroneous recognition of the working objects.

Moreover, the controller 4 may adjust the threshold value of the coincidence rate described with reference to FIG. 5 depending on a genre of a program. In this manner, the sound recognition processing according to programs can be performed.

Furthermore, in the linking processing, the controller 4 compares the position of the working object obtained from the video classification information CT1 and the estimated position of the sound source obtained from the sound classification information CT2, thereby determining whether or not the working object and the sound source correspond to each other. Here, the controller 4 may change the threshold value used at this time according to a genre of a program. This allows optimum linking processing according to the genre of the program to be performed.

Such setting of each processing may not be adjusted based on a genre of a program. For example, the setting of each processing may be adjusted based on a name of the program, or may be manually adjusted by the users according to their preferences. Moreover, broadcast stations may broadcast setting conditions of the sound recognition processing, the sound classification processing, the video recognition processing, the video classification processing and the linking processing corresponding to each program as the EPG (Electronic Program Guide), and the closed caption production device 200 may set each processing based on the received condition.

(14) Effects

In the closed caption production device 200 according to the present embodiment, the video recognition processing of the input video signal V1 is performed by the video recognizer 3*a*. This causes the working object in the video to be recognized. In addition, the sound recognizer 3*b* performs the sound recognition processing of the input sound signal A1. This causes the position of the sound source to be estimated.

The controller 4 compares the information of the working object recognized by the video recognition processing and the positional information of the sound source estimated by the sound recognition processing, thereby performing the linking processing.

Accordingly, the position of the closed caption produced based on the sound signal A1 is set in the vicinity of the working object in the video. This allows the users to reliably and easily recognize the correspondence between the sound source and the closed caption produced based on the sound.

(15) Modifications

While description is made of the example in which the video and sound input device 100 receives a digital broadcast, so that the digital video signal V1 and the digital sound signal A1 are input to the closed caption production device 200 in the present embodiment, the present invention is not limited to this. For example, the video and sound input device 100 may receive an analog broadcast, so that an analog video signal V1 and an analog sound signal A1 may be input to the closed caption production device 200.

While the video and sound input device 100 is a broadcast reception device, the video and sound input device 100 may be a drive device of recording media in which contents such as programs or movies are recorded. Such a drive device includes a DVD (Digital Versatile Disk) drive and so on, for example.

Also in this case, the closed caption production device 200 performs the same processing as the foregoing processing based on the video signal V1 and sound signal A1 input from the video and sound input device 100.

As described above, the closed caption production device 200 according to the present embodiment is applicable to all contents composed of the video signal V1 and the sound signal A1.

(16) Method of Implementing Each Component

In the present embodiment, part of the components of the closed caption production device 200 shown in FIG. 1 may be functionally implemented by software, and other parts may be implemented by hardware resources such as electric circuits. Alternatively, all of the components of the closed caption production device 200 may be implemented by hardware resources.

(17) Correspondences between Elements in the Claims and Parts in Embodiments

In the following paragraphs, non-limiting examples of correspondences between various elements recited in the claims below and those described above with respect to various preferred embodiments of the present invention are explained.

In the above-described embodiments, the persons P1, P2, P3, A, B, C and the helicopter HC are examples of a sound generating object and of a working object, the persons P1, P2, P3, A, B, C are examples of a plurality of persons, the controller 4, the video recognizer 3*a* and the video classifier 5*a* are examples of a video recognition means and a video position detection means, and the controller 4, the sound recognizer 3*b* and the sound classifier 5*b* are examples of a sound recognition means and of a sound position estimation means.

The video recognition information IF1 and the video classification information CT1 are examples of video information, the sound recognition information IF2 and the sound classification information CT2 are examples of sound information, the controller 4 and the text producer 6 are examples of a closed caption production means, the controller 4, the video/sound recognizer 3 and the video/sound classifier 5 are examples of an association means, and the controller 4, the character synthesizer 7, the video memory 8, the buffer 1 and the closed caption synthesizer 9 are examples of a synthesized video production means.

INDUSTRIAL APPLICABILITY

The present invention can be used for displaying closed captions.

The invention claimed is:

1. A closed caption production device that produces synthesized video including video of a sound generating object that generates sound and a closed caption of the sound generated from the sound generating object based on a video signal and a sound signal, the sound signal including sound signals of a plurality of channels, said device comprising:

a video recognizer that acquires information related to the video of the sound generating object as video information based on the video signal;

a video position detector that detects a display position of the video of the sound generating object, based on the video information acquired by said video recognizer;

a sound recognizer that acquires information related to the sound of the sound generating object as sound information based on the sound signals of the plurality of channels;

a sound position estimator that estimates a generation position of the sound of the sound generating object by comparing the sound signals of the plurality of channels having a same frequency, based on the sound information acquired by said sound recognizer;

a closed caption producer that produces a closed caption that represents, by at least one character, the sound generated from the sound generating object based on the sound information acquired by said sound recognizer;

an association processor that associates the display position of the video of the sound generating object detected by said video position detector and the generation position of the sound of the sound generating object estimated by said sound position estimator; and a synthesized video producer that produces the synthesized video by arranging the closed caption produced by said closed caption producer in a position corresponding to the display position of the video detected by said video position detector based on the display position of the video and the generation position of the sound that have been associated with each other by said association processor, wherein the sound generating object includes a plurality of working objects, said video recognizer acquires the information related to the video of each working object as the video information based on the video signal, said video position detector detects the display position of the video of each working object based on the video information acquired by said video recognizer, said sound recognizer recognizes each working object and associates the sound information that has been acquired with each working object that has been recognized, said sound position estimator estimates the generation position of the sound of each working object based on the sound information associated with each working object by said sound recognizer, said closed caption producer produces the closed caption that represents, by the at least one character, the sound generated from each working object based on the sound information acquired by said sound recognizer, said association processor associates the display position of the video of each working object detected by said video position detector with the generation position of the sound of each working object estimated by said sound position estimator, said synthesized video producer produces the synthesized video by arranging the closed caption of the sound generated from each working object produced by said closed caption producer in the position corresponding to the display position of the video of each working object detected by said video position detector based on the display position of the video of each working object and the generation position of the sound of each working object that are associated with each other by said association processor, the plurality of working objects include a plurality of persons, and the sound information includes information related to frequency characteristics of the sound generated from each person, and said sound recognizer recognizes each person that generates the sound by comparing the information related to the frequency characteristics of the sound that is newly acquired with the information related to the frequency characteristics of the sound that was previously acquired, and by determining whether or not a degree of coincidence indicating a level of coincidence between the information related to the frequency characteristics of the sound that is newly acquired and the information related to the frequency characteristics of the sound that was previously acquired exceeds a predetermined reference value.

2. The closed caption production device according to claim 1, wherein the position corresponding to the display position of the video of each working object is set such that a distance between the display position of the video of each working object and a display position of the closed caption of the sound of the working object is shorter than a distance between the display position of the video of the working object and a display position of a closed caption of sound of another working object.

3. The closed caption production device according to claim 1, wherein the video information includes information related to a shape and a size of the video of each working object, and said video recognizer recognizes each working object based on the information related to the shape and the size of the video of each working object, and associates the video information that has been acquired with each working object that has been recognized.

4. The closed caption production device according to claim 3, wherein the video information includes information related to a speed of the video of each working object, said video recognizer estimates a display position, after an elapse of a predetermined period of time, of the video of each working object based on the information related to the speed of the video of each working object, and said synthesized video producer produces the synthesized video by arranging the closed caption of the sound of each working object produced by said closed caption producer in a position corresponding to the display position, after the elapse of the predetermined period of time, of the video of each working object that has been estimated.

5. The closed caption production device according to claim 1, wherein said closed caption producer produces the closed caption that represents the sound generated from each of the plurality of working objects by the at least one character with a different color for each working object.

6. The closed caption production device according to claim 1, wherein each of the video signal and sound signal includes time information, and said synthesized video producer arranges in video the closed caption that has been produced at a timing where the sound is generated from the sound generating object based on the time information of each of the video signal and the sound signal to produce the synthesized video such that an output timing of the sound by the sound signal and a display timing of the closed caption coincide with each other.

7. The closed caption production device according to claim 1, wherein each of the video signal and sound signal includes genre information indicating a genre of a program including video and sound, said closed caption production device further comprising:

a genre determination processor that determines the genre of the program by detecting the genre information, and an adjustment processor that adjusts an acquiring operation of the video information by said video recognizer, a detecting operation of the display position of the video of the sound generating object by said video position detector, an acquiring operation of the sound information of the sound generating object by said sound recognizer, and an estimating operation of the generation position of the sound of the sound generating object by said sound position estimator.

8. The closed caption production device according to claim 1, wherein the sound position estimator compares amplitudes of the sound signals of the plurality of channels having the same frequency.

9. A closed caption production method for producing synthesized video including video of a sound generating object that generates sound and a closed caption of the sound generated from the sound generating object based on a video signal and a sound signal, the sound signal including sound signals of a plurality of channels, the method comprising:

acquiring information related to the video of the sound generating object as video information based on the video signal;

detecting a display position of the video of the sound generating object based on the video information that has been acquired;

acquiring information related to the sound of the sound generating object as sound information based on the sound signals of the plurality of channels;

estimating a generation position of the sound of the sound generating object by comparing the sound signals of the plurality of channels having a same frequency, based on the sound information that has been acquired;

producing a closed caption that represents, by at least one character, the sound generated from the sound generating object based on the sound information that has been acquired;

associating the display position of the video of the sound generating object that has been detected and the generation position of the sound of the sound generating object that has been estimated; and producing the synthesized video by arranging the closed caption that has been produced, in a position corresponding to the display position of the video that has been detected, based on the display position of the video and the generation position of the sound that have been associated with each other, wherein the sound generating object includes a plurality of working objects, the information related to the video of each working object is acquired as the video information based on the video signal, the display position of the video of each working object is detected based on the acquired video information, each working object is recognized and the sound information that has been acquired is associated with each working object that has been recognized, the generation position of the sound of each working object is estimated based on the sound information associated with each working object, the closed caption that represents, by the at least one character, the sound generated from each working object is generated based on the acquired sound information, the detected display position of the video of each working object is associated with the estimated generation position of the sound of each working object, the synthesized video is produced by arranging the closed caption of the sound generated from each working object in the position corresponding to the detected display position of the video of each working object, based on the display position of the video of each working object and the generation position of the sound of each working object that are associated with each other, the plurality of working objects include a plurality of persons, and the sound information includes information related to frequency characteristics of the sound generated from each person, and each person that generates the sound is recognized by comparing the information related to the frequency characteristics of the sound that is newly acquired with the information related to the frequency characteristics of the sound that was previously acquired, and by determining whether or not a degree of coincidence indicating a level of coincidence between the information related to the frequency characteristics of the sound that is newly acquired and the information related to the frequency characteristics of the sound that was previously acquired exceeds a predetermined reference value.

10. A non-transitory recording medium that stores a closed caption production program that can be read by a processor and that produces synthesized video including video of a sound generating object that generates sound and a closed caption of the sound generated from the sound generating object based on a video signal and a sound signal, the sound signal including sound signals of a plurality of channels, the program causing the processor to execute:

acquiring information related to the video of the sound generating object as video information based on the video signal;

detecting a display position of the video of the sound generating object based on the video information that has been acquired;

acquiring information related to the sound of the sound generating object as sound information based on the sound signals of the plurality of channels;

estimating a generation position of the sound of the sound generating object by comparing the sound signals of the plurality of channels having a same frequency, based on the sound information that has been acquired;

producing a closed caption that represents, by at least one character, the sound generated from the sound generating object based on the sound information that has been acquired;

associating the display position of the video of the sound generating object that has been detected and the generation position of the sound of the sound generating object that has been estimated; and producing the synthesized video by arranging the closed caption that has been produced, in a position corresponding to the display position of the video that has been detected, based on the display position of the video and the generation position of the sound that have been associated with each other, wherein the sound generating object includes a plurality of working objects, the information related to the video of each working object is acquired as the video information based on the video signal, the display position of the video of each working object is detected based on the acquired video information, each working object is recognized and the sound information that has been acquired is associated with each working object that has been recognized, the generation position of the sound of each working object is estimated based on the sound information associated with each working object, the closed caption that represents, by the at least one character, the sound generated from each working object is generated based on the acquired sound information, the detected display position of the video of each working object is associated with the estimated generation position of the sound of each working object, the synthesized video is produced by arranging the closed caption of the sound generated from each working object in the position corresponding to the detected display position of the video of each working object, based on the display position of the video of each working object and the generation position of the sound of each working object that are associated with each other, the plurality of working objects include a plurality of persons, and the sound information includes information related to frequency characteristics of the sound generated from each person, and each person that generates the sound is recognized by comparing the information related to the frequency characteristics of the sound that is newly acquired with the information related to the frequency characteristics of the sound that was previously acquired, and by determining whether or not a degree of coincidence indicating a level of coincidence between the information related to the frequency characteristics of the sound that is newly acquired and the information related to the frequency characteristics of the sound that was previously acquired exceeds a predetermined reference value.

* * * * *